United States Patent
Yamaguchi et al.

(10) Patent No.: US 7,049,589 B2
(45) Date of Patent: May 23, 2006

(54) PATTERN INSPECTION METHOD

(75) Inventors: Atsuko Yamaguchi, Kodaira (JP);
Hiroshi Fukuda, Kodaira (JP); Ryuta Tsuchiya, Mitaka (JP); Hiroki Kawada, Tshuchiura (JP); Shozo Yoneda, Fussa (JP)

(73) Assignees: Hitachi, Ltd., Tokyo (JP); Hitachi High-Technologies Corporation, Tokyo (JP)

( * ) Notice: Subject to any disclaimer, the term of this patent is extended or adjusted under 35 U.S.C. 154(b) by 129 days.

(21) Appl. No.: 10/752,527

(22) Filed: Jan. 8, 2004

(65) Prior Publication Data

US 2004/0195507 A1  Oct. 7, 2004

(30) Foreign Application Priority Data

Feb. 20, 2003  (JP)  ............................. 2003-042116

(51) Int. Cl.
*G01N 23/00* (2006.01)
(52) U.S. Cl. .................................... 250/310; 250/492.3
(58) Field of Classification Search ............. 250/492.3, 250/311
See application file for complete search history.

(56) References Cited

U.S. PATENT DOCUMENTS 4,908,656 A * 3/1990 Suwa et al. .................... 355/53
5,969,357 A * 10/1999 Todokoro et al. ........... 250/310

FOREIGN PATENT DOCUMENTS

| JP | 2000-349002 | 6/1999 |
| JP | 2001-159616 | 12/1999 |
| JP | 2002-243428 | 2/2001 |

OTHER PUBLICATIONS

K.K. Young, S.Y. Wu, C.C. Wu, C.H. Wang, C.T. Lin, J.Y. Cheng, M. Chiang, S.H. Chen, T.C. Lo, Y.S. Chen, J.H. Chen, L.J. Chen, S.Y. Hou, JJLiaw, T.E. Chang, C.S. Hou, J. Shih, S.M. Jeng, H.C. Hsieh, Y. Ku, T. Yen, H,. Tao, L.C. Chao, S. Shue, S.M. Jang, T.C. Ong, C.H. Yu, M.S. Liang, C.H. Diaz, J.Y.C. Sun, "A 0.13 μm CMOS Technology with 193 nm Lithography and Cu/Low-k for High Performance Applications", 2000 IEEE, 4 pages.

(Continued)

*Primary Examiner*—Nikita Wells
*Assistant Examiner*—Kalimah Fernandez
(74) *Attorney, Agent, or Firm*—Reed Smith LLP; Stanley P. Fisher, Esq.; Juan Carlos A. Marquez, Esq.

(57) ABSTRACT

The present invention may include a pattern inspection method of extracting a pattern edge shape from an image obtained by a scanning microscope and inspecting the pattern. A control section and a computer of the scanning microscope process the intensity distribution of reflected electrons or secondary electrons, find the distribution of gate lengths in a single gate from data about edge positions, estimate the transistor performance by assuming a finally fabricated transistor to be a parallel connection of a plurality of transistors having various gate lengths, and determine the pattern quality and grade based on an estimated result. In this manner, it is possible to highly, accurately and quickly estimate an effect of edge roughness on the device performance and highly accurately and efficiently inspect patterns in accordance with device specifications.

8 Claims, 17 Drawing Sheets

OTHER PUBLICATIONS

Ryuta Tsuchiya, Kazuhiro Ohnishi, Masatada Horiuchi, Shimpei Tsujikawa, Yasuhiro Shimamoto, Naomi Inada, Jiro Yugami, Fumio Ootsuke and Takahiro Onai, "Femto-Second CMOS Technology with High-k Offset Spacer and SiN Gate Dielectric with Oxygen-enriched Interface", 2002 IEEE, 2002 Symposium on VLSI Technology Digest of Technical Papers, 2 pages.

Shiying Xiong, Jeffrey Bokor, Qi Xiang, Philip Fisher, Ian Dudley and Paula Rao, "Study of Gate Line Edge Roughness Effects in 50 nm Bulk MOSFET Devices", Metrology Inspection and Process Control for Microlithography XVI, Proceedings of SPIE vol. 4689 (2002), pp. 733-741.

Carlos H. Diaz, Hun-Jan Tao, Yao-Ching Ku, Anthony Yen and Konrad Young. "An Experimentally Validated Analytical Model for Gate Line-Edge Roughness (LER) Effects on Technology Scaling", 2001 IEEE Electron Device Letters, vol. 22, No. 6, Jun. 2001, pp. 287-289.

Linard Karklin, Artur Balasinski and Valery Axelrad, "A Novel Procedure for Evaluating Design Scalability Based on Device Performance Linked to Photolithography", Jpn. J. Appl. Phys., vol. 39 (2000), pp. 6792-6795.

Phil Oldiges, Qinghuang Lin, Karen Petrillo, Martha Sanchez, Meikei Ieong, and Mike Hargrove, "Modeling Line Edge Roughness Effects in sub 100 Nanometer Gate Length Devices", Digest of International Conference on Simulation of Semiconductor Process and Devices, 2000, pp. 131-134.

* cited by examiner

FIG. 22

| No | CD | LWR |
|---|---|---|
| 1 | 83 | 2.1 |
| 2 | 84.2 | 3.2 |
| 3 | 76 | 4.1 |
| 4 | 83.9 | 2.2 |
| 5 | 78.9 | 4.5 |
| 6 | 76.5 | 3.6 |
| 7 | 83.8 | 1.8 |
| 8 | 76.2 | 4.4 |
| 9 | 75.6 | 4.2 |
| 10 | 82.9 | 3.8 |
| AVERAGE | 80.1 | 3.39 |

DESIGNED CD : 80 nm
CD VARIATION ($3\sigma$) : 10.73 nm
DEVIATION FROM DESIGNED CD ($3\sigma$) : 10.73 nm

PATTERN INSPECTION METHOD

PRIORITY CLAIM

This application claims priority under 35 U.S.C. §119 to Japanese patent application P2003-042116 filed Feb. 20, 2003, the entire disclosure of which is hereby incorporated herein by reference.

FIELD OF THE INVENTION

The present invention relates to a pattern inspection method and more particularly to a method of inspecting shapes of fine patterns formed on a semiconductor substrate by means of non-destructive measurements using a scanning microscope and detailed dimension measurements using an image process.

BACKGROUND OF THE INVENTION

For example, the inventors examined the following technologies associated with a method for inspecting fine patterns formed on a semiconductor substrate.

In accordance with a recent tendency toward fine semiconductor device structures, careful consideration is being given to distribution of essential pattern sizes due to the presence of edge roughness, i.e., unevenness along edges of a fine pattern formed on a semiconductor substrate. The line width of a transistor's gate pattern is equivalent to a gate length that determines device characteristics. A fine process of 100 nm or less causes the roughness of approximately 5 to 10 nm based on 3σ (σ: standard deviation) for a line on the pattern side. If this roughness is converted into 3σ for the line width, i.e., the gate length, a distribution of 7 to 14 nm results. The roughness may become 10% or more of the gate length. Very locally, though, there may occur a portion where the gate length becomes approximately 10% shorter.

The distribution of gate lengths in one gate region may degrade the transistor performance such as an increased leak current in the power-off state, a threshold voltage shift, and the like. Especially when the gate length becomes 80 nm or less, the threshold voltage largely depends on the gate length. The management of line width variations is therefore important.

Firstly, it is necessary to measure the edge roughness and line width variations using an appropriate method. The appropriate method here includes providing fully accurate measurement in accordance with the gate width, i.e., the line length of a transistor to be evaluated and estimating a deviation from the true value. This is because the roughness measurement provides different results depending on measurement area sizes and measurement intervals. The prior art has not taken this point into consideration and determined measurement parameters in reliance on measurer's experience. Accordingly, variations are found in measurement results for the same pattern.

Secondly, it is necessary to quantitatively estimate the transistor performance degradation caused by a line width variation and keep track of a margin for the line width variation.

The relationship between a gate length and a threshold voltage is described in non-patent documents 1, IEDM Technical Digest, December 2000, pp563–567 and 2, 2002 Symposium on VLSI Technology Digest of Technical Papers 15-3, 2002.

For example, non-patent document 3, Digest of International Conference on Simulation of Semiconductor Process and Devices (SISPAD), 2000, pp. 131–134, reports a methodology for calculating performance degradation of a transistor caused by edge roughness in a gate pattern. In this document, a calculation flow is described assuming that the line-width distribution in one gate pattern has been already obtained.

Nevertheless, it has been difficult to obtain the real line-width distribution in a gate pattern accurately thus far for lack of the function in SEM. Thus, transistor performance has been estimated only from the standard deviation (sigma) of the line-width distribution. For example, non-patent documents 4, Proceedings of SPIE, 2002, Vol. 4689, pp. 733–741 and 5, IEEE Electron Device Letters, 2001, Vol. 22, pp. 287–289 report this study.

The former example calculates the transistor performance by varying actual gate lengths σ, 1.5σ, and 2σ smaller than the designed value and alerts possible performance degradation.

The latter example uses a gate-length fluctuation, value $\Delta L$, to divide the gate into two portions in which one causes an actual gate length to be smaller than the designed value and the other causes an actual gate length to be greater than the designed value. The gate length variation for each portion is set to $\pm\Delta L$ which is input to an equation for finding a threshold voltage from the gate length, thus finding a threshold voltage variation.

On the other hand, when a single line contains a plurality of transistors having short gate widths, a long-period fluctuation in the line width causes a variation in the average gate length for each transistor, namely an average of gate lengths along the gate width direction for individual transistors. Accordingly, a variation occurs in the transistor characteristics. This phenomenon is described in non-patent document 6, Japanese Journal of Applied Physics Part 1, 2000, Vol. 39, pp. 6792–6795. for example. The gate length fluctuation is not the only cause of a variation in the transistor performance. As finer devices are available, however, an effect of the gate length fluctuation becomes not negligible. In this manner, a small-period fluctuation degrades the device performance. A large-period fluctuation causes a variation in the device performance. It is necessary to develop a technology that accurately measures a line width variation using an appropriate technique and clarifies an effect thereof on devices.

The above-mentioned method estimates electrical characteristics of devices on the semiconductor substrate by finding a gate width fluctuation from the pattern shape. Further, there is another method of finding a gate width fluctuation from a contrast of the image using a scanning electron microscope (hereafter referred to as SEM). The use of this method can detect continuity or discontinuity of devices without calculating gate shapes in detail. This is described in patent document 1, JP-A No. 159616/2001 for example.

The experiments of analyzing roughness shapes are described in patent documents 2, JP-A No. 349002/2000 and 3, JP-A No. 243428/2002, for example. These methods calculate similar roughness shapes using a spatial-frequency distribution of data obtained from actual line pattern images or extract contribution of specific frequency components from the original data.

SUMMARY OF THE INVENTION

The present inventors note that there has not been available a well-grounded measurement method for measuring a roughness or gate length fluctuation. The methods described in the above-mentioned patent documents 2 and 3 cannot provide a method of inspecting the roughness that varies with an area length or a measurement location.

As mentioned above, the former example described in the background of the invention evaluates the transistor performance degradation according to the gate length distribution. This example uses the transistor performance of gate length $L_g$–$\sigma$, $L_g$–$1.5\sigma$, or $L_g$–$2\sigma$ to inspect the transistor performance of gate length designed value $L_g$ and fluctuation $\sigma$. The latter example described in the background of the invention assumes the transistor having gate length designed value $L_g$ and fluctuation $\Delta L_g$ to be an average of transistors having gate length $L_g \pm \Delta L_g$. Actually, however, there are a very few transistors in which the gate length is shorter than the designed value by $1.5\sigma$ or $2\sigma$ or more. Though the amount of threshold voltage shift is large, it causes a small effect to the whole. How serious the effect will be is unknown. There is also an effect of portions in which the gate length is greater than the designed value. The latter example described in the background of the invention simplifies the gate length distribution to be $L_g \pm \Delta L_g$ and seems to be more accurate than the former example described in the background of the invention. Since the former example gives no consideration to the contribution of the portions in which the gate length is shorter than $L_g$–$\Delta L_g$, however, there may be an incapability of inspecting the transistor characteristic in an area where the short-channel effect is large.

The above-mentioned report estimates a variation in the transistor performance from standard deviation $\sigma$ for the line width variation. However, this method does not provide a technique of independently evaluating a large-period fluctuation contributing to the performance variation and a small-period fluctuation causing performance degradation.

As mentioned above, there is provided the method of finding electrical characteristics of transistors from a contrast appearing on an SEM image. This method uses a contrast difference generated by electrostatic charge on the surface of a sample to be observed. It is necessary to apply electron beams enough to fully charge the sample. There is a possibility of damaging the under-lying layer.

Therefore, the present invention may provide a method of calculating measurement parameters for finding an average value or a distribution of line widths based on logical grounds in the pattern inspection of transistor gates. The present invention may also use the obtained numeric values and accurately and quickly estimate an effect of edge roughness or line width variation on the performance of a transistor to be finally fabricated without causing damages to a device. The present invention may also provide a pattern inspection means for evaluating a pattern under observation using that method.

The following summarizes some potential aspects of the present invention disclosed in this application.

(1) A pattern inspection method according to the present invention comprises the steps of: calculating unevenness of the edge occurring in an area of length $L_1$ along a line direction, a line width, or a variation in the line width on the basis of two-dimensional distribution information about a reflected electron intensity or a secondary electron intensity obtained by observing a line pattern formed on a substrate through the use of an ion beam based scanning microscope; measuring a plurality of edge positions on a line or line widths for the calculation within an area of specified length $L_2$ calculated in accordance with the length $L_1$. The length $L_2$ is larger than or equal to $L_1$ multiplied by 0.5 when $L_1$ is greater than or equal to 1 μm, or equals $L_1$ when $L_1$ is smaller than or equal to 0.5 μm. And also by assuming that when the inspection area length ($L_1$) equals greater than 0.5 μm to less than 1 μm that the measurement area length ($L_2$) is 0.5 μm;

(2) A pattern inspection method according to the present invention comprises the steps of: calculating unevenness of the edge occurring in an area of length L along a line direction, a line width, or a variation in the line width at intended accuracy on the basis of two-dimensional distribution information about a reflected electron intensity or a secondary electron intensity obtained by observing a line pattern formed on a substrate through the use of an ion beam based scanning microscope; measuring a plurality of edge positions on a line or line widths for the calculation at a specified interval $\Delta y$; and specifying intended accuracy by ratio p of an allowable error to a true value during the calculation and calculating an upper bound of measurement interval $\Delta y$ from length L and p in an observation area.

(3) According to the pattern inspection method as set forth in aspect (2), $\Delta y$ is approximated to p*L when L is smaller than 0.1 μm; wherein $\Delta y$ is approximated to $p*(1/f_0)*L^n$ or less using parameter $f_0$, where $n=1-\log_{10} f_0$, when L is larger than or equal to 0.1 μm and is smaller than 1 μm; and wherein $\Delta y$ is approximated to $p*(1/f_0)*L^m$ or less using parameter m, when L is larger than or equal to 1 μm.

(4) When calculating the degree of edge unevenness or a line width variation, the pattern inspection method as set forth in aspect (2) defines the number of calculations N so that L*N becomes 2 μm or more.

(5) A pattern inspection method according to the present invention comprises the steps of: calculating unevenness of the edge occurring in an area of length $L_1$ along a line direction, a line width, or a variation in the line width on the basis of two-dimensional distribution information about a reflected electron intensity or a secondary electron intensity obtained by observing a line pattern formed on a substrate through the use of an ion beam based scanning microscope; measuring a plurality of edge positions on a line or line widths on the line pattern for the calculation within an area of line $L_2$ shorter than $L_1$; calculating a spatial-frequency distribution of data about unevenness of the edge measured at length $L_2$, the line width, or a variation in the line width; obtaining an approximated curve by approximating the spatial-frequency distribution with a curve; using the approximated curve and the spatial-frequency distribution to calculate a spatial-frequency distribution intensity and a phase of f-components which may be calculated when a spatial-frequency distribution is obtained from data measured in the area of length $L_1$; and calculating data about edge unevenness that may occur in the area of length $L_1$, the line width, or a variation in the line width from the distribution intensity and the phase.

(6) A pattern inspection method according to the present invention inspects a pattern by using two-dimensional distribution information about a reflected electron intensity or a secondary electron intensity obtained by observing a pattern formed on a substrate through the use of an ion beam based scanning microscope and estimating the performance of a semiconductor device to be fabricated according to a pattern under observation or process conditions equivalent to the pattern. The pattern inspection method comprises the steps of: calculating a plurality of pattern edge points at a specified interval from the intensity distribution of reflected electrons and secondary electrons and calculating a plurality of gate lengths from coordinates of the edge points; inputting data that represents a transistor's ideal electrical performance with no gate length variations; and using the input data and values of a plurality of gate lengths obtained from the reflected electron intensity or the secondary electron intensity and estimating the performance of a transistor to be fabricated according to a sample under observation or a process equivalent to the sample under observation.

(7) A pattern inspection method according to the present invention inspects a line pattern by using two-dimensional distribution information about a reflected electron intensity or a secondary electron intensity obtained by observing a line pattern formed on a substrate through the use of an ion beam based scanning microscope and estimating the performance of a semiconductor device including a line pattern to be fabricated according to a line pattern under observation or conditions equivalent to the pattern. The pattern inspection method comprises the steps of: calculating a plurality of edge points at both edges of the line pattern from the intensity distribution of reflected electrons or secondary electrons; calculating a plurality of line widths from coordinates of the edge points; calculating a gate length distribution occurring in one gate area of a transistor to be fabricated through a specified process from the plurality of line widths; and estimating the transistor performance by assuming the transistor having one gate with the gate length distribution to be a circuit comprising a plurality of transistors having gate lengths equivalent to values constituting the gate length distribution.

(8) According to the pattern inspection method as set forth in aspect (7), the sample under observation is made of resist or an under-lying material for the resist layer. A process of calculating the gate length distribution occurring in one gate area uses line widths at a plurality of locations on a pattern to estimate the distribution of effective gate lengths to be finally formed by way of a dry etching process.

(9) The pattern inspection method as set forth in aspect (8) estimates the performance of one transistor by using a curve representing the relationship between a drive current value and a gate voltage or using a threshold voltage obtained from the curve.

(10) A pattern inspection apparatus according to the present invention comprises: an ion beam source; an optical system to irradiate and scan an ion beam generated from the ion beam source onto a sample through a convergent lens and an objective lens; a stage for mounting the sample; a detector to detect an intensity of secondary electrons or reflected electrons from the sample after irradiation of the ion beam; a control section to control the scanning; a means for inputting ideal electrical characteristics for semiconductor devices; and a signal processing means for calculating electrical characteristics of a semiconductor device including the pattern or a gate pattern formed under conditions equivalent to the pattern from a signal intensity distribution obtained from a pattern on the sample and the ideal electrical characteristics for semiconductor devices in the intensity distribution of secondary electrons or reflected electrons.

According to aspect (1), the measurement for line edge roughness or line width variation can use a length of a first line whose roughness or line width variation needs to be found and, in accordance with this length, calculate a length of a second line to be measured actually.

According to aspects (2) and (3), it is possible to calculate an interval for detecting edge points or measuring line widths during the measurement and perform the measurement with an error smaller than or equal to a specified value.

According to aspect (4), it is possible to find the number of measurements enough to obtain data for averaging conditions of roughness or line width variation whose values vary with locations.

According to aspect (5), it is possible to estimate a roughness or a line width variation occurring in an area having an intended length by measuring a line shorter than an area targeted to find a value for roughness or line width variation.

According to aspects (6), (7), (8), (9), and (10), it is possible to estimate a variation of the transistor's final gate length and highly accurately estimate transistor's electrical characteristics based on data about the edge roughness or the line width variation obtained as mentioned above.

BRIEF DESCRIPTION OF THE DRAWINGS

FIG. 22 is an example of a table showing inspection result data.

DETAILED DESCRIPTION OF THE PREFERRED EMBODIMENTS

Figure 1:
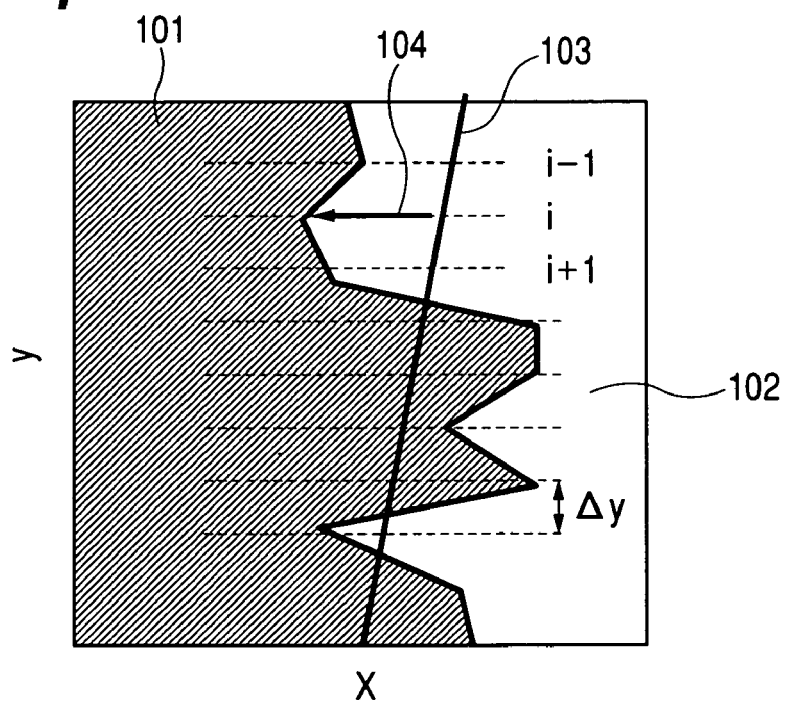
FIG. 1 is a pattern diagram showing a method of finding a pattern edge having roughness and the edge roughness therefrom.

Embodiments of the present invention will be described in further detail with reference to the accompanying drawings. The same parts or components are depicted by the same reference numerals and a detailed description is omitted for simplicity.

The following describes an example of the pattern inspection method according to an embodiment of the present invention.

The embodiment calculates measurement parameters for finding an average value or a distribution of line widths from SEM images for line patterns as follows.

FIG. 1 shows an SEM observation image for a line pattern. The reference numeral 101 represents an area representing a pattern under-lying layer, and 102 a pattern area. When an SEM observation is conducted to measure the line edge unevenness or the edge roughness, i is a general practice to linearly approximate a boundary between the pattern and the under-lying layer, i.e., a set of line edge points as shown in FIG. 1 and measure a difference 104 between an obtained approximate line 103 and the actual edge point. This difference is defined as $\Delta x_i$, where it is a number of a profile, i.e., a primary distribution of secondary electrons or reflected electrons comprising the same y-coordinate data out of elements constituting the data image. The profile number indicates a number along the vertical direction of edge points. There is provided $\Delta y$ that is a vertical coordinate difference between the ith edge point and the (i+1)th edge point. Value $\Delta y$ is a constant value independent of i. To find a line width variation, the embodiment detects edge points at right and left edges of the line and finds its horizontal distance, i.e., line width $w_i$. The embodiment gives average value $w_{av}$ for $w_i$ values in an area to be measured and finds line width variation $\Delta w_i = w_i - w_{av}$ for each i.

Figure 2:
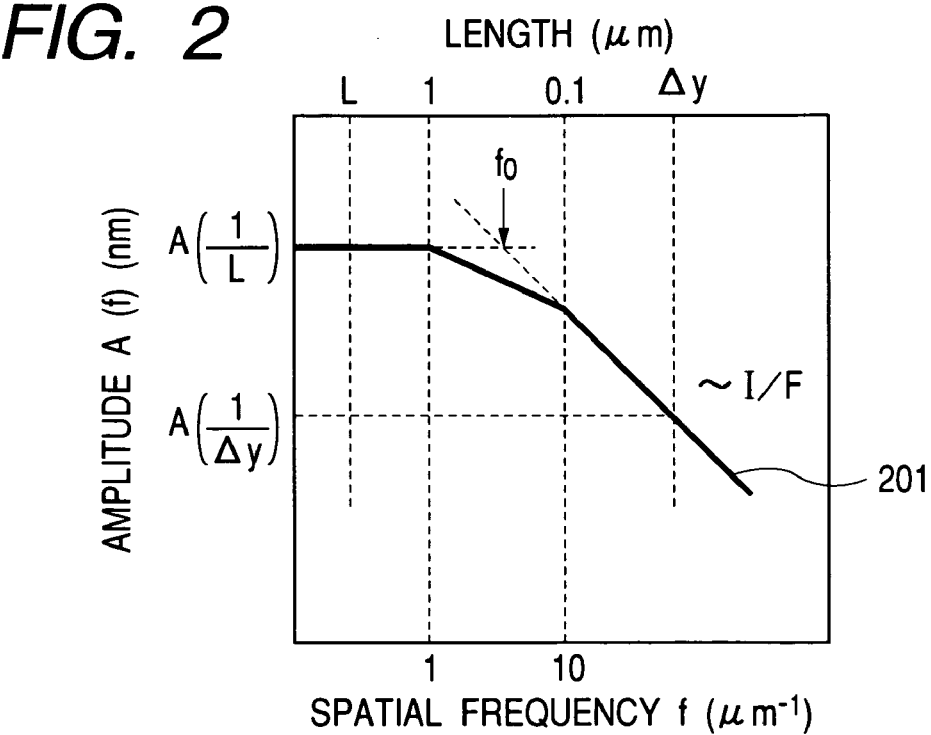
FIG. 2 is a schematic diagram showing a typical spatial-frequency distribution of line edge roughness or line width variation.

A Fourier transform is applied to series $\{\Delta x_i | i=0, 1, 2 \ldots\}$ and $\{\Delta w_i | i=0, 1, 2, \ldots\}$ obtained in this manner to calculate and plot the frequency dependence of an amplitude on absolute value A(f), i.e., a spatial-frequency distribution of edge roughness and line width variation. We found that the distribution is approximately traced on a polygonal line 201 in FIG. 2. The graph in FIG. 2 uses the ordinate for absolute value A(f) and the abscissa for spatial frequency f. Both are indicated logarithmically. A unit of 1/μm is used for f. FIG. 2 shows a result of measuring line patterns comprising various resists such as an-electron beam resist, a DUV resist, and the like. The polygonal line 201 can be formulated as follows using parameter $A_0$ (a value of A(f) with f=1) equivalent to a degree of the fluctuation.

In an area of f>10 μm$^{-1}$:

$$A(f) = A_0 \cdot \frac{1}{f}$$ [Equation 1]

In an area of 1 μm$^{-1} \leq f \leq 10$ μm$^{-1}$:

$$A(f) = \frac{A_0}{f_0} \cdot f^{-n}$$ [Equation 2]

In an area of f$\leq$1 μm$^{-1}$:

$$A(f) = \frac{A_0}{f_0} \cdot f^{-m}$$ [Equation 3]

where n is defined as follows:

$$n = 1 - \log_{10} f_0$$ [Equation 4]

In the above-mentioned equations, m takes a value ranging from 0 to 0.25 except that the roughness under observation is abnormal. An abnormal roughness is generated from a device or mask defect or from an incomplete prevention against reflection and always appears on a specific pattern or has a specific frequency.

As seen from the polygonal line 201, there are fluctuations having unlimitedly long frequencies. This result makes it clear that an area smaller than those indicated above is inappropriate for the measurement to find a fluctuation concerning a given gate width, i.e., line length L. For the pattern inspection of a transistor with gate width L, it is desirable to measure an area for line length L. When the gate width is 1 μm or less, preferably 0.5 μm or less, and especially 300 nm or less, it is strongly recommended to measure a line having the same gate width (measurement area) for the following two reasons.

The first reason is that amplitude A(f) is greatly dependent on spatial frequency f in an area equivalent to a period of 1 μm or less, i.e., an area of f$\geq$1 μm$^{-1}$ in FIG. 2. For this reason, slightly elongating an area to be observed increases roughness components for a new measurement, increasing the inspection-area length dependence of the roughness.

The second reason is that, in rare cases, there is a resist having special frequency distribution. As shown with curves 1902 and 1903 in FIG. 19, some resist has a peak characteristic of a specific frequency area.

Figure 3:
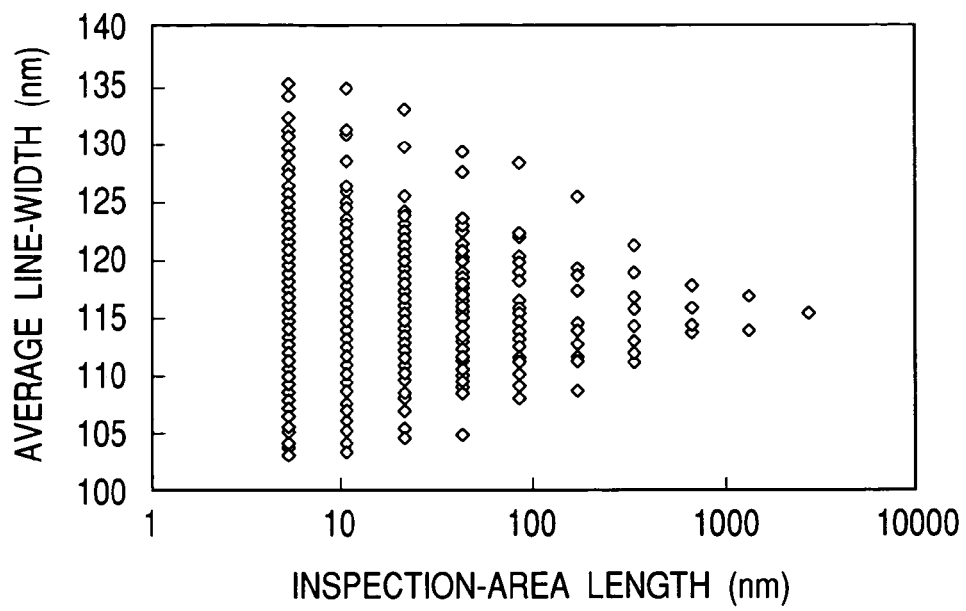
FIG. 3 is a graph showing relationship between an average line width and a measurement area length.
Figure 4:
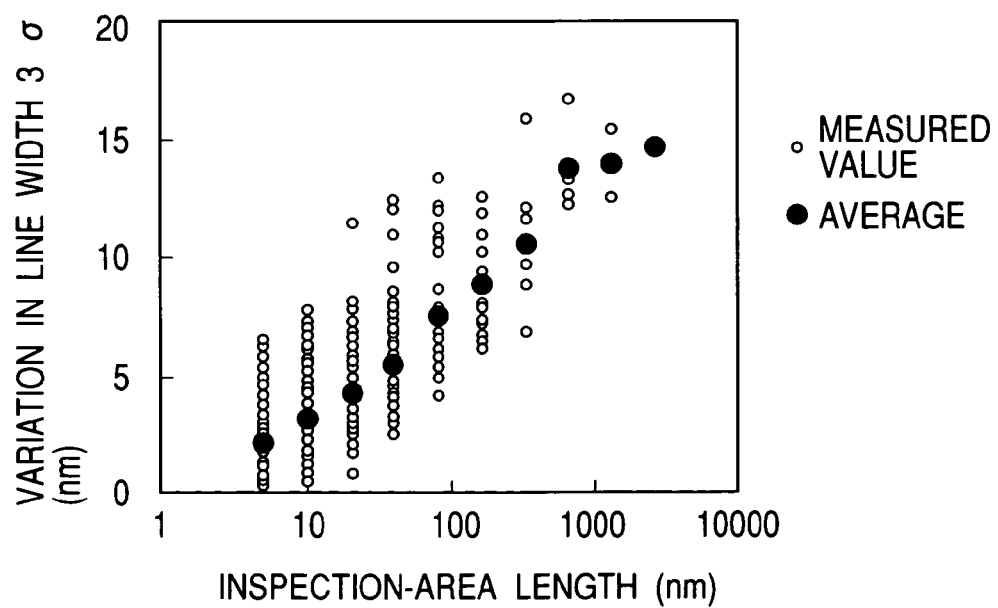
FIG. 4 is a graph showing relationship between a line width variation amount and a measurement area length.

The first reason will be described in more detail. The following describes an example of measuring the line width of a line 2.7 μm long. First, the line is equally divided into $2^n$ (where n is a natural number) areas in a direction along the line. An average line width is calculated in these $2^n$ areas (areas of 2.7/$2^n$ μm long). Within these areas, a line width variation is found by tripling standard deviation σ from the average line width. FIG. 3 shows relationship between the average line width and the measurement area length obtained in this manner. FIG. 4 shows relationship between the line width variation 3σ and the measurement area length.

According to FIGS. 3 and 4, an average of 3σ decreases approximately 5% near the measurement area length of 1 μm even when the measurement area length is halved. The average line width distribution expands just approximately 2%. When the measurement area length becomes approximately 0.5 μm, however, values for 3σ measured in the ½-long area distribute more widely and the average value varies 30% or more. The average line width distribution expands more widely. We measured several lines and found similar results.

Therefore, when the gate width (measurement area) is 1 μm or more, it may be allowed to measure a half-length line in an inevitable case. However, the gate width of 1 μm or less is undesirable for the measurement.

It is also possible to measure a line shorter than the gate width and perform simulation to estimate roughness of the gate having an intended gate width. Also in this case, the reliability degrades by shortening the length of a line to be measured with reference to the gate width. This estimation method will be described later.

The following describes a measurement interval for correctly measuring the roughness of a line having length L from image data. The first step is to find a relationship between a ratio p of an error to the true value (hereafter referred to simply as an error) and measurement interval $\Delta y$. The edge roughness or the gate-length variation in an area having the line length of L comprises waves in an area having the spatial frequency of 1/L or more. The greatest contributing component has a spatial frequency of 1/L and an amplitude of A(1/L). When this edge or line is measured through the use of measurement interval $\Delta y$, components having the spatial frequency of $1/\Delta y$ or more cannot be measured. Of such non-measured components, the greatest contributing component has an amplitude of $A(1/\Delta y)$. When the standard deviation $\sigma$ is to be calculated in the distribution of roughnesses or line width variations, there is a possibility of deviation for approximately $A(1/\Delta y)/A(1/L)$ from the true value. Accordingly, it is possible to assume:

$$p = \frac{A\left(\frac{1}{\Delta y}\right)}{A\left(\frac{1}{L}\right)} \quad \text{[Equation 5]}$$

Figure 5:
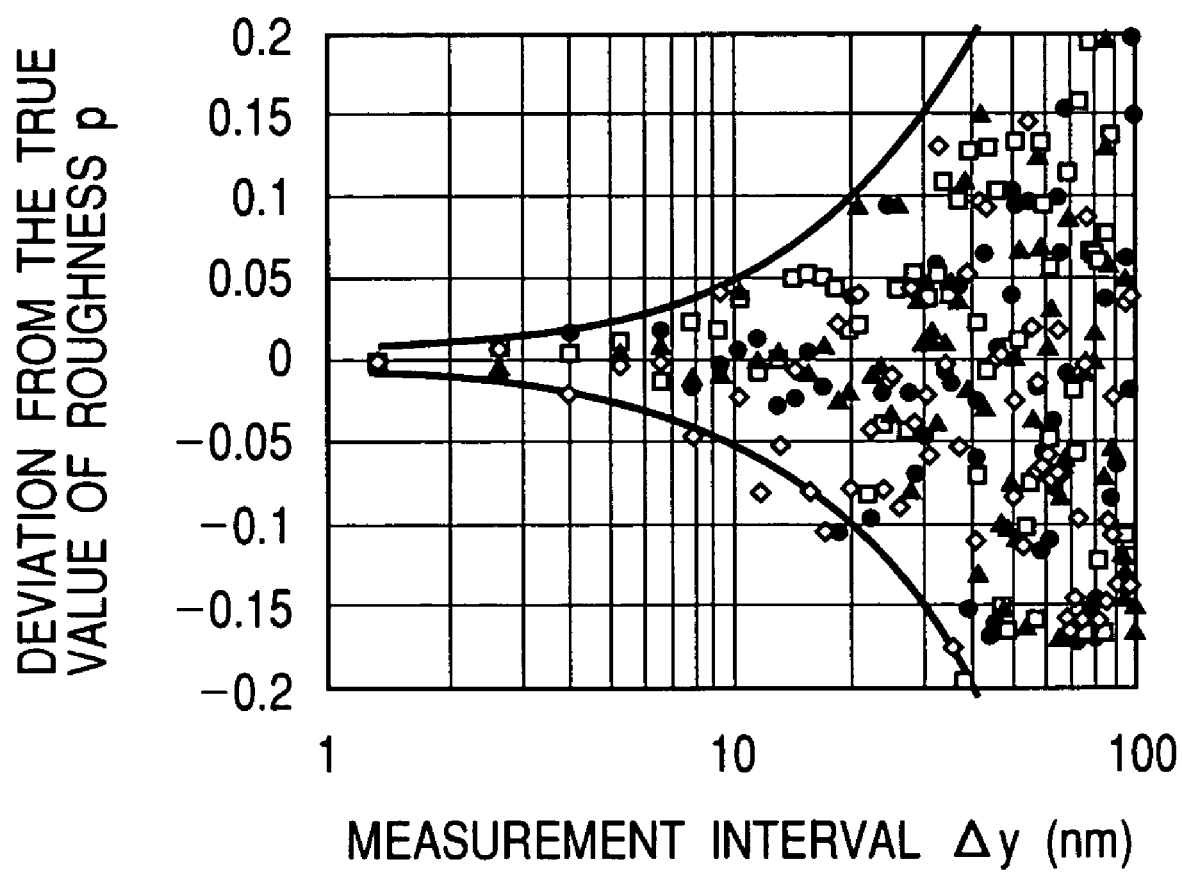
FIG. 5 is a graph showing relationship between a deviation from the true roughness value and measurement interval.

FIG. 5 shows a result of actually measuring a roughness size ($3\sigma$ for variations in edge point positions) with respect to a line edge of 1 μm length by varying a measurement interval. FIG. 5 depicts a relationship between a deviation from the true roughness value and a measurement interval. The ordinate represents a deviation amount p from the true roughness value. The abscissa represents measurement interval $\Delta y$. The true value is measured with the finest possible measurement interval (1.3 nm in this example). The calculation is performed to divide a value for $3\sigma$ measured at measurement interval $\Delta y$ by the true value and subtract 1 from the result to find p (a degree of deviation from the true value). A curve in the figure represents values found from (Equation 5). Because of L=1 (μm), (Equation 2) is used as a function type for A(f) There is provided an assumption of $f_0=5(\mu m^{-1})$ It is understood that the above-mentioned equation very well reproduces the experiment result.

Raising the standard deviation $\sigma$ to the second power, i.e., distribution $\sigma^2$ equals a summation of squared amplitude on the f-space. By using this relationship, it is possible to calculate a ratio of deviation $\Delta\sigma^2$ from the true distribution value to true value $\sigma^2$ as follows.

$$\frac{\Delta\sigma^2}{\sigma_0^2} = \frac{\sum_{f>1/\Delta y} A(f)^2}{\sum A(f)^2} \quad \text{[Equation 6]}$$

Value p is found by extracting the square root of both terms in (Equation 6). The following example uses (Equation 5) that make the calculation simpler though (Equation 6) can be also used for estimation.

(Equation 5) and the polygonal line 201 can be used to find the upper bound (maximum value) of measurement intervals needed for measuring a variation in edge points or line widths or the line width itself on the basis of error p or less with respect to an area (measurement area) for the gate width, i.e., line length L. When L=2 μm, for example, let us assume parameter $f_0$ of the polygonal line 201 to be 5 $\mu m^{-1}$ and m to be 0. It is just necessary to find a spatial frequency whose amplitude becomes 10% of $A_0/5$ so as to enable the measurement with an error of 10% or less. The high-frequency area of the polygonal line 201 shows the 1/f-dependence, yielding $1/\Delta y \geq 50$. Accordingly, a value for $\Delta y$ just needs to be set to 0.02 μm or less.

As mentioned above, it is possible to find $\Delta y$ by settling allowable error p for various L values. This is formulated as (Equation 7) to (Equation 10), where $\Delta y$ is assumed to be 0.1 μm or less. This assumption is valid for the following reason.

If value p is actually 10% or less against an L value (several tens μm or less) used for ordinary devices, value $\Delta y$ estimated from the rectangular line 201 in FIG. 2 does not exceed 0.1 μm.

$$\Delta y = C \cdot p \quad \text{[Equation 7]}$$

where C is a variable for L. When L<0.1 μm:

$$C = L \quad \text{[Equation 8]}$$

When 0.1 μm $\leq$ L<1 μm:

$$C = \frac{1}{f_0} \cdot L^n \quad \text{[Equation 9]}$$

When L $\geq$ 1 μm:

$$C = \frac{1}{f_0} \cdot L^m \quad \text{[Equation 10]}$$

If it is clear that the device performance is not affected by a fluctuation smaller than or equal to a given period $L_{crit}$, the calculated upper bound of $\Delta y$ is compared with $L_{crit}$, and a greater value may be redefined as the upper bound of $\Delta y$. A value for $L_{crit}$ can be estimated from, e.g., a minimum value for fluctuation periods in the distribution of electric fields near the channel or the distribution of doping concentrations in the direction of the gate width.

The above-mentioned concept can be applied even when L is a very large value and an area of length L is too long to fit in one piece of image data. When a line width variation is to be measured, for example, $\Delta y$ determined by using the above-mentioned equation is used as a measurement interval. An image is obtained by moving $\Delta y$ along the line to measure the line width. It is just necessary to repeat this procedure. In many cases, this method finds a line width by averaging the signal profiles for an area of a specified length or measuring many points on the image. It is desirable to determine the length of the area used for a single measurement to be smaller than measurement interval $\Delta y$.

The above-mentioned approximation method for the spatial-frequency distribution is only an example. It may be preferable to use the other approximation methods that provide similar results.

The following describes the method of estimating a roughness or a line width variation across the entire area (measurement area) of the gate from the above-mentioned data for the roughness or the line width variation found for the line shorter than the actual gate width (measurement area) Let us assume W to be the width of a gate whose roughness is to be estimated; and L to be the length of an observable line. It is desirable to approximate L to W. As mentioned above, some resists allow line edges having roughnesses of 50 to 300 nm in terms of spatial frequencies. However, an observable line needs the length of 300 nm or more. Experientially, a preferred line length is 1 μm or more. This length L is observed at a specified measurement interval to obtain data for edge point positions or sizes. The data is Fourier-transformed to obtain an A(f) graph. This result is defined as-measured data here.

Then, the polygonal line 201 is used to approximate the obtained measured data. To do this, the polygonal line 201 is parallel moved in the graph to find an optimal parameter value $A_0$ so that the polygonal line 201 can approximate the measured data in an area of f>1/L. The approximated curve (or line) already found as mentioned above is used to find A(f) for f that is not obtained from the original data. The example here assumes both of m=0 and m=0.25.

A reverse Fourier transform is applied to the spatial-frequency distribution obtained in this manner to calculate the roughness in the real space. There is no problem about value f for the originally measured spatial-frequency distribution A(f). However, only an absolute value of the Fourier coefficient is given to value f for A(f) that is found from the approximated curve (or line). For this reason, the Monte-Carlo simulation is used to randomly set a phase. In this manner, the roughnesses for m=0 and m=0.25 are obtained. An actual roughness size seems to be found between both cases. The similar method can be used to find not only the roughness, but also a fluctuation in the line width.

Even if these methods are used to calculate line edge roughnesses or line width variations, the values vary with measured locations. Accordingly, a plurality of calculations is needed to find a typical value for the edge roughness or the line width variation with respect to the sample under observation. Assuming the number of calculations to be N, it is preferable to assign the largest possible value to N.

Our experiment has shown that N needs to be given a value so that the product of L by N is 2 μm or more. This can be explained from the polygonal line in FIG. 2. A period for the line width variation tends to saturate when it becomes 1 to 2 μm or more. If a variation is observed for an area over this period, the degree of the new variation does not differ from the degree of the variation measured in the area of 1 to 2 μm. Since the variation in the real space is the sum of these components, measuring a long area increases the degree of roughness, but decreases a variation for the area length. It is a good practice to measure the roughness so that the total measured length becomes 2 μm or more.

This method is valid when L is 2 μm or more. This is because the degree of roughness measured in long-L area does not vary much when measured at various places. Therefore, in the case that L is 500 nm, a user has to measure roughness four times and calculate the average. However, if L equals 2 μm, one measurement is enough. There are two methods to calculate averaged roughness. One is to obtain a summation of roughness values, and divide it by the number of measurements. The other is to obtain summation of squared roughness values and divide it by the number of measurements, and then, calculate its square root. Either will do because these two values are not different much in the case of normally occurring roughness in resist patterns. During N times of measurements, these N areas must not overlap with each other.

According to the embodiment, pattern edge points are detected from an observed image of the pattern. This uneven shape of edges is used to estimate distribution of gate lengths in the gate. The distribution is obtained when the gate pattern is created. There may be a case where a patter to be observed is not a gate pattern, e.g., a resist pattern on the gate. In such case, an edge roughness obtained from the observed pattern image is used to estimate distribution of effective gate lengths obtained when creating a gate pattern of an intended size. This distribution is used to calculate electrical characteristics of a transistor to be manufactured.

Selecting the gate pattern as an observation pattern enables more accurate calculation. In this case, the distribution of effective gate lengths is estimated from a set of line widths obtained by measuring a plurality of locations on the line pattern being actually observed. This distribution is used to calculate electrical characteristics of a transistor to be manufactured.

Figure 6:
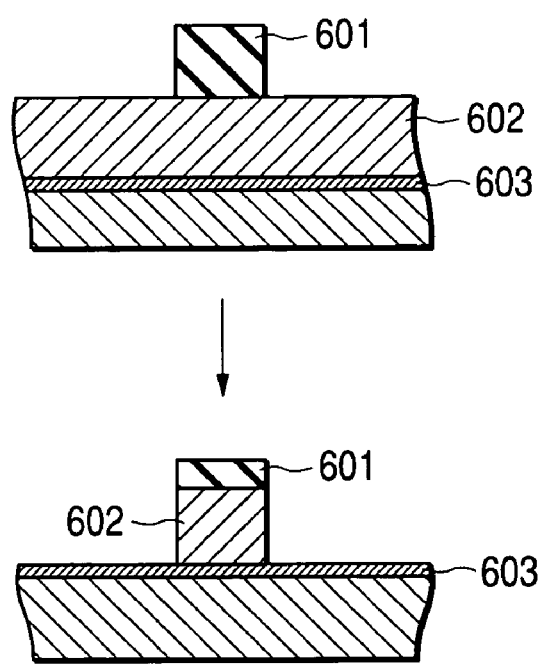
FIG. 6 is a sectional conceptual diagram showing part of a gate pattern process for dry-etching a resist pattern on a mask.

As shown in FIG. 6, a gate pattern is generally created by the lithography and the subsequent dry etching. FIG. 6 is a conceptual diagram showing a silicon wafer in section after the lithography and that after the dry etching. First, the lithography is used to form a resist pattern 601 on a silicon layer 602 as a gate material. Then, the dry etching is used to transfer the pattern to the silicon layer 602 using the resist pattern 601 as a mask. The dry etching stops at a gate insulation layer 603 under the silicon layer 602. Thereafter, the ashing is used to remove the resist pattern 601. In some cases, an intermediate layer may be inserted between the resist and the silicon layer 602 during etching of the silicon layer 602. This intermediate layer is made of a material capable of selection ratios. In this case, the intermediate layer is patterned using the resist pattern 601 as a mask. The intermediate layer is further used as a mask to process gates. Though omitted here, a so-called antireflection layer is provided between the resist and the intermediate layer. The embodiment calculates the roughness of the gate pattern (silicon layer 602) from a result of observing the resist pattern 601 and the intermediate layer pattern using previously stored data for edge shape changes during the dry etching. Alternatively, a subsequent process may use the gate pattern's roughness shape and previously stored data to calculate a distance between source and drain areas formed by ion implantation, i.e., the distribution of effective gate lengths. These calculations make it possible to estimate the distribution of effective gate lengths from an SEM image observed for the pattern shape of the resist or a layer thereunder It is a good practice to evaluate the transistor performance found from the distribution of effective gate lengths based on the dependence of drive current $I_d$ on gate voltage $V_g$ under the condition of constant voltage $V_d$ applied to the drain. Better understandability can be achieved by the threshold voltage calculated from the above-mentioned dependence though the amount of information decreases. It is possible to perform the pattern inspection in a short time by using the calculated threshold voltage to check the quality of the pattern.

The following describes the method of evaluating an effect of fluctuation components whose period is longer than the transistor's gate width. The description covers: (1) size fluctuations caused by a layout problem, e.g., a thickened or thinned line or a thinned line end due to arrangement of another nearby pattern; (2) size fluctuations caused by irregular thicknesses or components of an under-lying layer or a pattern formation layer; and (3) spontaneously generated fluctuations except those that can be estimated or analyzed to some extent by conventional methods such as lens or mask defects occurring in specific exposure systems.

As mentioned above, a long-period fluctuation acts as a variation of an average line length and affects variations of the transistor performance. A gate width corresponding to one transistor area is assumed to be L. According to the above-mentioned method, one-time measurement is conducted to find guideline quantities representing the device performance such as the distribution of gate lengths in one gate, a threshold voltage calculated therefrom, and the like.

A fluctuation has the spatial-frequency distribution that can approximate to the polygonal line 201 in FIG. 2. The embodiment uses the polygonal line 201 expressed by (Equation 1) through (Equation 4) to approximate the spatial-frequency distribution. This is only an example. It may be preferable to use the other curves that provide a similar result. As mentioned above, components for the line width variation tend to saturate when the period becomes 1 to 2 µm or more. There are many components having any large periods.

Now, let us consider that gate width L is 1 µm or more. When the typical device performance is calculated for an area having gate width L, and its variation is checked, it is necessary to observe an area where L becomes sufficiently small. Therefore, it is desirable to measure areas ten times or more than that area. The same applies to a case where the gate width is 1 µm or less. In this case, it is necessary to observe areas approximately equivalent to at least 2 µm in total. When N' is assumed to be the number of measurements for the variation observation, the value should be set to, for example, 2/L of gate width L (µm) or 10, whichever is larger. When the measurement needs to be more accurate, the condition should be configured to 4/L and 20, respectively.

When the threshold voltage is calculated for one transistor, minimum and maximum values are found by conducting the measurement for N' times so that measurement areas do not overlap with each other. An effect of the roughness can be evaluated in terms of a decrease and a variation in the threshold voltage against the designed value.

The obtained data is used to calculate device characteristics during the above-mentioned manufacturing process. In this manner, it is possible to estimate degradation and variation in the performance of each device.

When the embodiment is applied to the measurement of variations in the line edge roughness or the gate length, calculate a second line length (measurement area) dedicated to actual measurement in accordance with a first line length (inspection area) dedicated to find the roughness or the line width variation.

During the measurement, it is possible to calculate an edge point detection interval or a line width measurement interval and conduct the measurement with an error below the predetermined value.

When the measurement is conducted for a line shorter than the inspection area, i.e., an area for which the roughness or the line width variation needs to be obtained, it is possible to estimate the roughness or the line width variation that may occur in an area of the specified length.

It is possible to find the sufficient number of measurements for obtaining data used to average conditions of the roughness or the line width variation whose value depends on locations.

Further, it is possible to estimate variations in the final gate length of the observed object or a device created with same conditions based on data of the edge roughness or the line width variation obtained as mentioned above.

The high-precision estimation is available especially in consideration for changes due to the edge roughness or the line width variation during processes such as dry etching and ion implantation.

Moreover, it is possible to calculate electrical characteristics of a transistor from the gate length variation estimated by the above-mentioned processes and estimate variations in electrical characteristics of a plurality of transistors.

WORKING EXAMPLES

The following describes working examples of the pattern inspection system and method for implementing the above-mentioned embodiments in further detail with reference to the accompanying drawings.

Working Example 1

Figure 7:
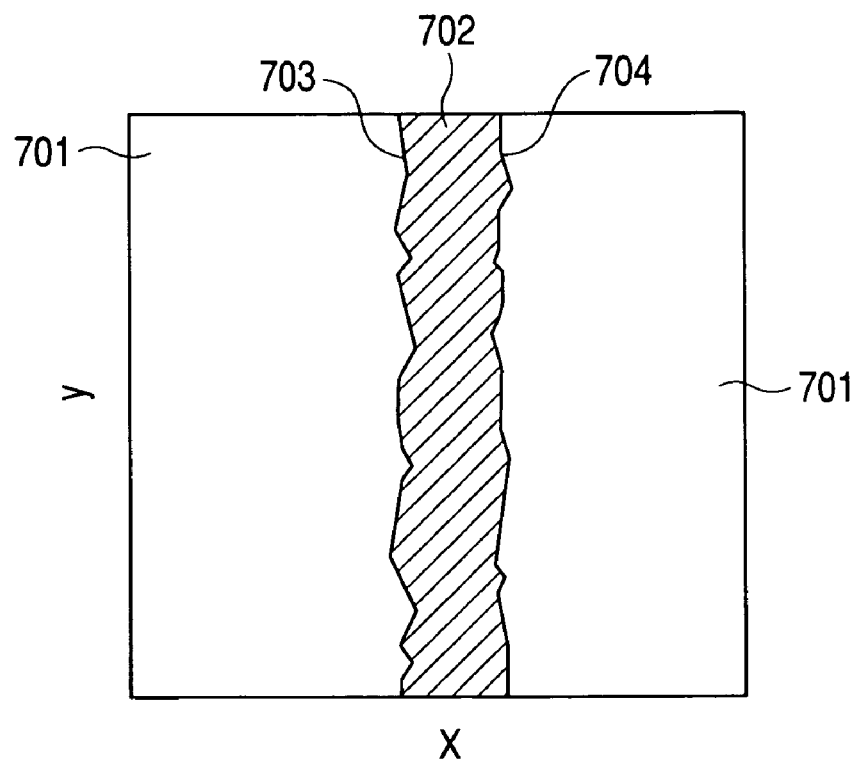
FIG. 7 is a schematic diagram showing an observation image evaluated in embodiment of the present invention.
Figure 8:
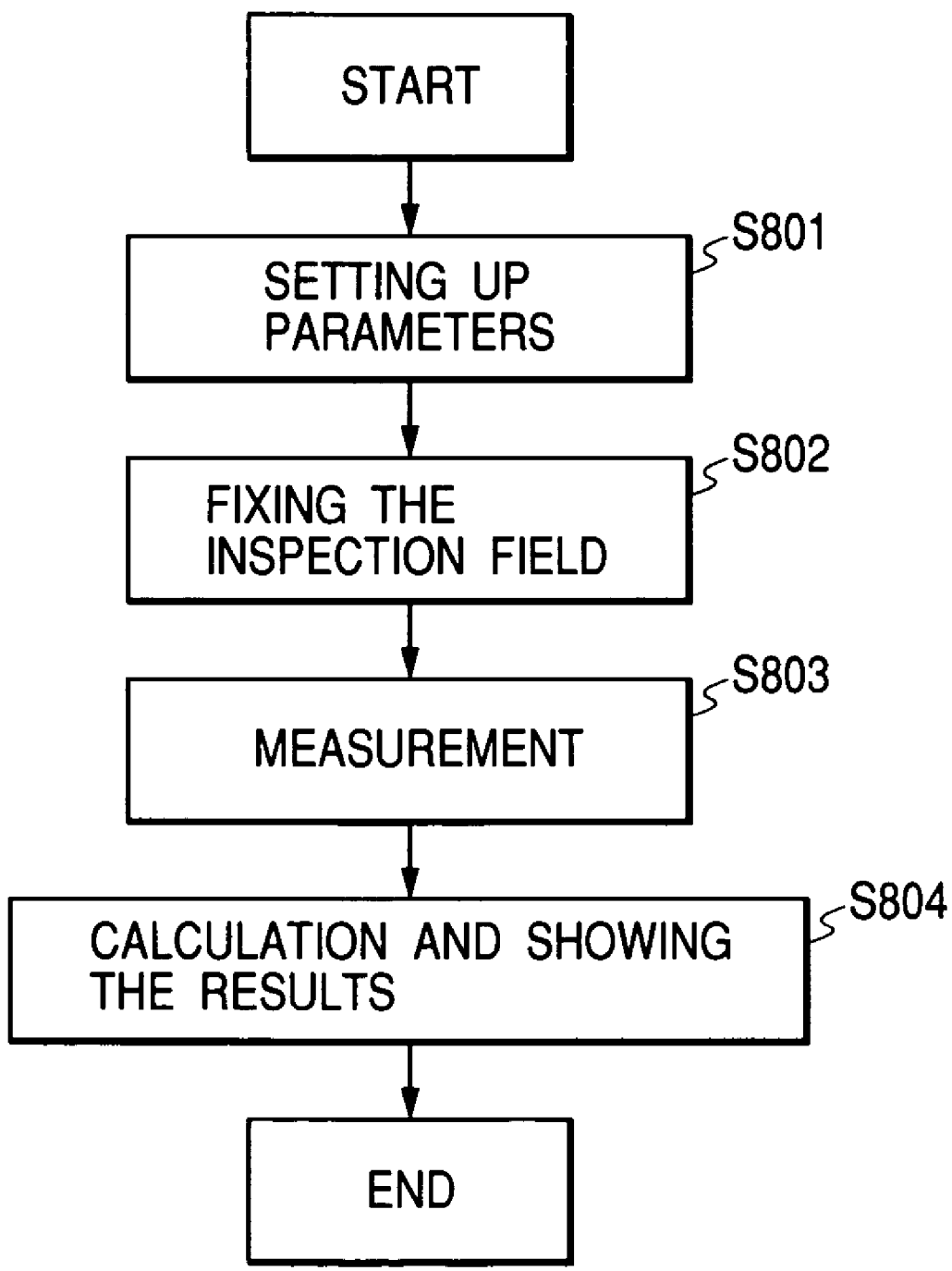
FIG. 8 is a flowchart showing part of procedures in embodiments 1, 2, 4, and 8 of the present invention.

FIG. 7 is a pattern diagram showing an image observed by a scanning electron microscope. FIG. 8 is a flowchart showing a procedure of working example 1.

Working example 1 describes an example of calculating a line width variation from an SEM image that is obtained for the line pattern with a specified accuracy by using the present invention.

Working example 1 inspects a line pattern comprising a polycrystalline silicon corresponding to the transistor gate. In terms of designed sizes, the gate is 80 nm long and 0.6 µm wide. It is desirable that the actual gate width equals the length of a line in an inspection area for measuring the line width variation. For this purpose, the length of the observation area in the line direction is approximated to the gate width within a possible range. When the scanning electron microscope used for working example 1 is set to a magnifying power of two hundred thousands for observation, the visual field has the vertical size of 675 mm. The gate area under inspection can be fit in a single image. Accordingly, the inspection uses an image with the magnification of two hundred thousands. FIG. 7 shows a pattern diagram of this image. A pattern under-lying area 701 corresponds to an under-lying exposed silicon dioxide layer. A pattern area 702 comprises polycrystalline silicon. A left edge 703 and a right edge 704 of the line pattern correspond to left and right edges of a line corresponding to the gate, respectively. Data corresponding to the image comprises 512 pixels in x and y directions in FIG. 7. The secondary electron intensity is converted into a gray scale representing light and shade in the image. A gray scale value is assigned to each pixel.

This image data is analyzed in accordance with a process as shown in FIG. 8. The system first finds parameters for the inspection (step S801). It is assumed to enter the inspection area length of 600 nm and allowable error p of 5%. The system calculates the number of pixels most approximate to 600 nm in the image with the magnification of two hundred thousands and a maximum edge measurement interval for ensuring the 5% error. The inspection area length is equivalent to 455 pixels. From equations (Equation 4), (Equation 7), and (Equation 9), the measurement interval results in 8.6 nm, i.e., approximately 6.5 pixels. Parameter $f_0$ is set to value 5. Since the number of pixels should be an integer, the result is rounded to 6 pixels by setting $\Delta y=7.9$ nm. Value M represents the number of measurement points and is set to 76 here. This value is obtained by adding 1 to a maximum integer that does not exceed a value obtained by dividing the number of pixels in the inspection area by the measurement interval. These parameters can be automatically calculated by supplying only an inspection area length and an allowable error. The measurement interval becomes a maximum value within a possible range. The number of measurement points becomes a minimum value within a possible range. When there is an inconsistency between values entered by an operator or there is a missing value, the contradictory item or the item for the missing numeric value is displayed in red to prompt the operator for correction.

In order to prevent the image resolution from being degraded due to averaging, it is desirable to use an averaging parameter of $\Delta y$ or less for removing a noise from the image data. Accordingly, the averaging parameter is set to 6. A profile for edge detection is given as an average of six consecutive profiles. A smoothing parameter is set to 5 here because it should be a maximum odd number smaller than the averaging parameter. These two parameters can be also calculated automatically. In addition, the operator can specify these parameters manually. When the averaging parameter and the smoothing parameter entered by the operator are greater than Δy, the entered values are indicated in red with an alert. If the operator keeps these values unchanged, the operator-specified values are used for averaging and smoothing.

The inspection area is then specified (step S802). One method is to use a keyboard to enter coordinates. The other is to use a mouse to draw a rectangle on the SEM image and input it as the inspection area. The latter method is used here. A screen shows a rectangle having the inspection area length specified at step S801. The inspection area is displayed on the image by manipulating the mouse to adjust these positions, the width of the rectangle, i.e., the edge retrieval area, and an interval between two rectangles.

Then, an instruction is issued to measure the line width in the specified area (step S803). As a result, there are obtained positions for the right and left edge points on 76 profiles arranged at regular intervals. A distance between the right and left edge points corresponds to the line width on each profile.

These line widths are defined to be $w_i$ (i=0, 1, 2, ... 75) for calculating and displaying average $w_{av}$, maximum value $w_{max}$, minimum value $w_{min}$, and a triple of standard deviation $\sigma_w$ of the line width distribution, i.e., $3\sigma_w$, (step S804). The results are $w_{av}$=80.3 nm, $W_{max}$=85.6 nm, $W_{min}$=74.0 nm, and $3\sigma_w$=9.0 nm. In this manner, the present invention can be used to find the line width variation with an allowable error specified for the intended area.

The above-mentioned parameters are provided just for reference. Actual values may differ from them. In working example 1, the number of pixels for Δy just needs to be 6 or less. It may be preferable to use 5 or 4 pixels.

When there are restrictions on the number of data items and the like, there may be an alternative to sacrifice the accuracy by using a large value such as 7 or 8 pixels with reference to the above-mentioned values. Likewise, it is also possible to calculate a standard deviation for position fluctuations of each edge or its tripled value, i.e., a so-called edge roughness size instead of the line width variation.

Working Example 2

Working example 2 of the present invention will be described with reference to the above-mentioned flowchart in FIG. 8.

Working example 2 describes an example of finding a standard deviation for the line width distribution with respect to a long area of 1 μm or more from an SEM image that is obtained for the line pattern with a specified accuracy by using the present invention.

Similarly to working example 1, working example 2 inspects a line pattern comprising a polycrystalline silicon corresponding to the transistor gate. In terms of designed sizes, the gate is 80 nm long and 2 μm wide. It is desirable that the actual gate width equals the length of a line in an inspection area for measuring the line width variation. The length of the observation area in the line direction should preferably be approximated to the gate width within a possible range. It is also desirable to approximate the length of the observation area in the line direction to 5 μm. For this purpose, however, the scanning electron microscope used for working example 2 must be adjusted to a magnifying power of approximately fifty thousands for observation so that one image can contain an area having a vertical size of 2 μm by keeping the image's aspect ratio unchanged. This causes a problem of degrading the resolution. To solve this problem, a variable aspect ratio function is used to set vertical and horizontal magnifications to different values. The horizontal magnification is set to two hundred thousands. The vertical magnification is set to fifty thousands.

First, parameters for the inspection are specified (step S801). On a parameter specification screen, an operator selects the variable aspect ratio function as well as the horizontal magnification of two hundred thousands and the vertical magnification of fifty thousands as mentioned above. When the operator enters the inspection area length of 2000 nm and allowable error p of 10%, the system calculates the number of pixels most approximate to 2000 nm in an image at 50000× magnification and a maximum edge measurement interval in order to satisfy the 10% error. The number of pixels results in 380. The calculation follows equations (Equation 7) and (Equation 10) using parameters $f_0$=5 and m=0. The maximum measurement interval results in 20 nm, i.e., approximately 3.8 pixels. Since the number of pixels should be an integer, the result is rounded to 3 pixels by setting Δy=15.8 nm. Value M represents the number of measurement points and is set to 127 here. This value is obtained by adding 1 to a maximum integer that does not exceed a value obtained by dividing the number of pixels in the measurement area by the measurement interval. These parameters can be automatically calculated by supplying only an inspection area length and an allowable error. The measurement interval becomes a maximum value within a possible range. The number of measurement points becomes a minimum value within a possible range. When there is an inconsistency between values entered by an operator or there is a missing value, the contradictory item or the item for the missing numeric value is displayed in red to prompt the operator for correction. It is necessary to independently enter the width of an area for detecting an edge. The value is assumed to be 40 pixels here.

In order to prevent the image resolution from being degraded due to averaging, it is desirable to use an averaging parameter of Δy or less for removing a noise from the image data. Accordingly, the averaging parameter is set to 3. The smoothing parameter is set to 5 here. These two parameters can be also calculated automatically. In addition, the operator can specify these parameters manually.

The inspection area is then specified (step S802). One method is to use a keyboard to enter coordinates. The other is to use a mouse to draw a rectangle on the SEM image and input it as the inspection area. The latter method is used here. A screen shows two rectangles in total each at the right and left edges having the inspection area length and the edge retrieval area width specified at step S801. The inspection area is displayed on the image by manipulating the mouse to adjust these positions and an interval between two rectangles.

Then, an instruction is issued to measure the line width in the inspection area specified at step S802 (step S803). As a result, there are obtained positions for the right and left edge points on 127 profiles arranged at regular intervals. A difference between these positions corresponds to the line width on each profile.

A set of line widths is defined to be $\{w_i | i=0, 1, 2, \ldots, 75\}$ for calculating and displaying average $w_{av}$, maximum value $w_{max}$, minimum value $w_{min}$, and a triple of standard deviation $\sigma_w$ of the line width distribution, i.e., $3\sigma_w$ (step S804). The results are $w_{av}$=79.3 nm, $w_{max}$=87.6 nm, $w_{min}$=72.0 nm, and $3\sigma_w$=10.5 nm. In this manner, the present invention can be used to find the line width variation with an allowable error specified for the intended area longer than or equal to 1 μm. Likewise, it is also possible to calculate a standard deviation for position fluctuations of each edge or its tripled value, i.e., a so-called edge roughness size instead of the line width variation.

Working Example 3

Figure 9:
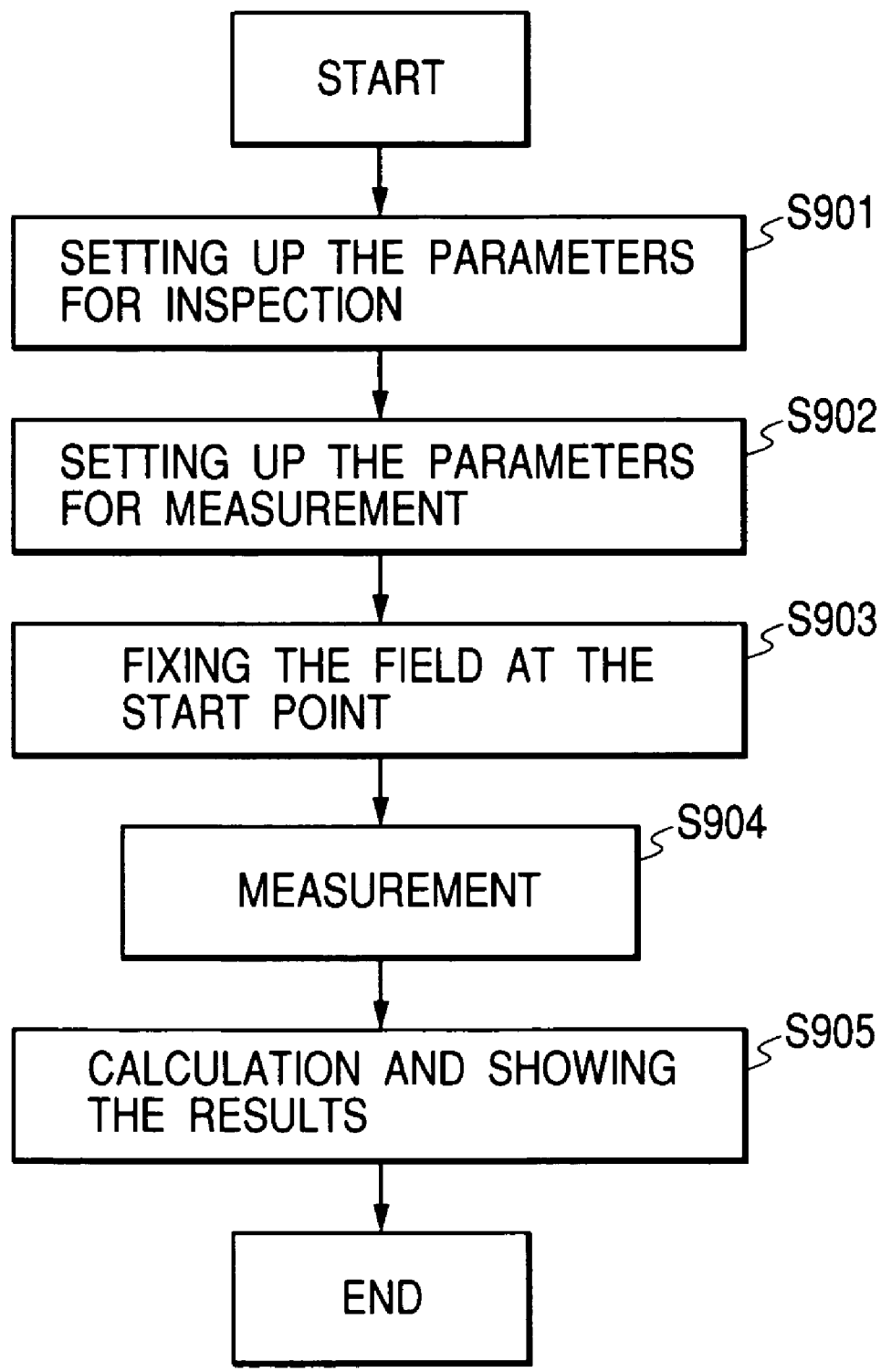
FIG. 9 is a flowchart showing a procedure in embodiment 3 of the present invention.

FIG. 9 shows a process for working example 3.

Working example 3 describes an example of finding a standard deviation for the line width distribution with respect to a long area of 1 µm or more from an SEM image that is obtained for the line pattern with a specified accuracy by using the present invention.

Similarly to working example 1, working example 3 inspects a line pattern comprising a polycrystalline silicon corresponding to the transistor gate. In terms of designed sizes, the gate is 80 nm long and 10 µm wide. It is desirable that the actual gate width equals the length of a line in an area for measuring the line width variation. It is also need to approximate the length of the observation area in the line direction to 10 µm. Even if the variable aspect ratio function is used, however, the horizontal magnification must be set to two hundred thousands and the vertical magnification to ten thousands, causing a difference of 20 times. The scanning electron microscope used for working example 3 is not provided with a setting for such large difference between magnifications in the X- and Y-directions. To solve this problem, the measurement was conducted as follows.

The system first calculates parameters for the inspection (step S901). When the operator enters the inspection area length of 10000 nm and allowable error p of 10% on the parameter specification screen, the system calculates a maximum interval for measuring the line width in order to satisfy the 10% error. The calculation follows equations (Equation 7) and (Equation 10) using parameters $f_0=5$ and m=0. The maximum measurement interval results in 20 nm. When the observation magnification is set to two hundred thousands, the measurement area length results in 7590 pixels; the measurement interval results in 15 pixels; and the number of measurement points M results in 506. These parameters can be automatically calculated by supplying only an inspection area length and an allowable error. The measurement interval becomes a maximum value within a possible range. The number of measurement points M becomes a minimum value within a possible range. When there is an inconsistency between values entered by the operator or there is a missing value, the contradictory item or the item for the missing numeric value is displayed in red to prompt the operator for correction.

We then specified a measurement condition for calculating the line width at each measurement point (step S902). Here, we selected a method of summing profiles in the specified area to create one line profile and finding the line width therefrom. Generally, this method is called a single mode. The single mode makes it necessary to specify the length of an area for summing profiles. This area length is specified with the number of pixels and must be shorter than the above-mentioned measurement interval. The area length is set to 10 pixels here.

A stage is moved so that the bottom end of the inspection area is centered at the observation area (step S903).

When an inspection start button is pressed, the system automatically measures the line width in the single mode. The system then stores the measurement point number 1 and the line width 81.2 nm in a storage area (step S904). The stage is then moved vertically on the screen for 15 pixels to measure the line width again. The system stores a measurement point number by incrementing the previous number by 1 as well as the measured line width. In this manner, the system repeats the line width measurement and the state movement 506 times, and then stops the measurement.

From the values for 506 line widths, the system calculates and displays average $w_{av}$, maximum value $w_{max}$, minimum value $w_{min}$, and a triple of standard deviation $\sigma_w$ of the line width distribution, i.e., $3\sigma_w$ (step S905). The results are $w_{av}$=81.0 nm, $w_{max}$=88.6 nm, $w_{min}$=71.0 nm, and $3\sigma_w$=12.3 nm.

In this manner, the present invention can be used to find the line width variation with an allowable error specified for the intended area longer than or equal to 1 µm. Likewise, it is also possible to calculate a standard deviation for position fluctuations of each edge or its tripled value, i.e., a so-called edge roughness size instead of the line width variation.

Working Example 4

Figure 10:
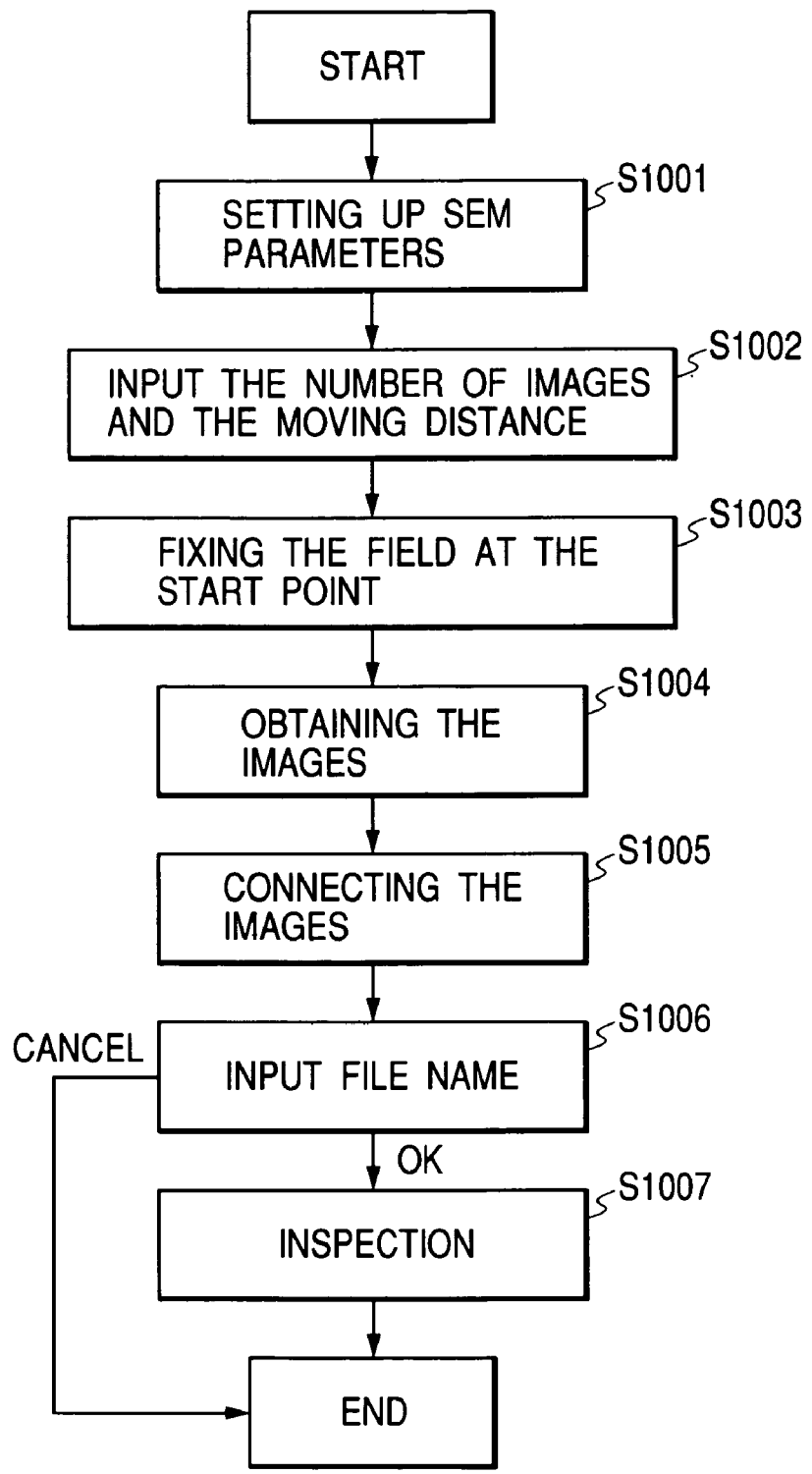
FIG. 10 is a flowchart showing a procedure in embodiment 4 of the present invention.
Figure 11:
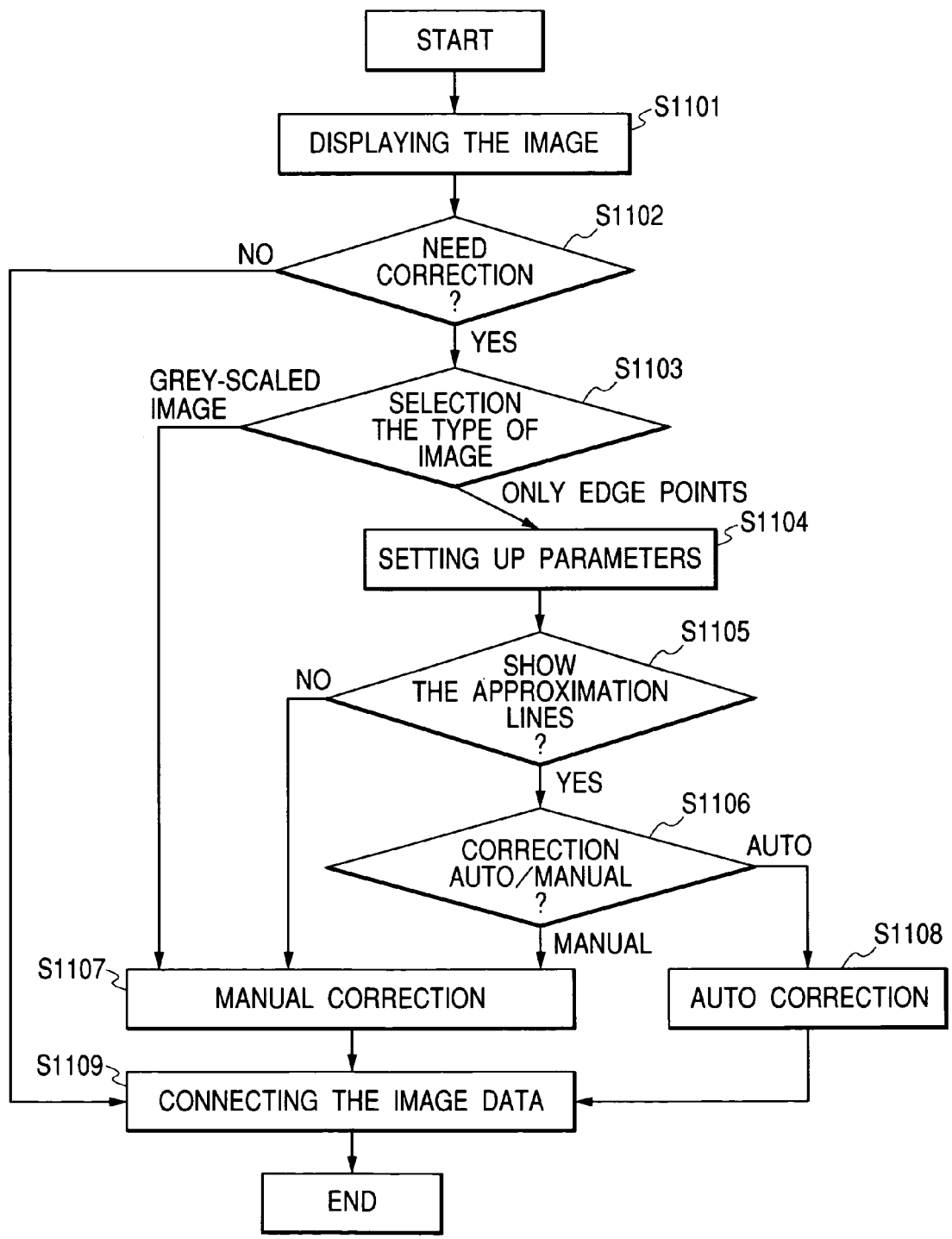
FIG. 11 is a flowchart showing part of the procedure in embodiment 4 of the present invention.

Working example 4 according to the present invention will be described with reference to FIGS. 8, 10, and 11 as mentioned above. FIG. 10 is a flowchart showing a process of working example 4. FIGS. 8 and 11 show part of FIG. 10 in detail.

Working example 4 describes an example of finding a standard deviation for the line width distribution with respect to a long area of 1 µm or more from an SEM image that is obtained for the line pattern with a specified accuracy by using the present invention.

Similarly to working example 1, working example 4 inspects a line pattern comprising a polycrystalline silicon corresponding to the transistor gate. In terms of designed sizes, the-gate is 80 nm long and 4 µm wide. It is desirable that the actual gate width equals the length of a line in an inspection area for measuring the line width variation. However, the scanning electron microscope used for working example 4 is not provided with the function capable of independently specifying magnifications in the X- and Y-directions. On the other hand, there has been available the function of detecting edge points by concatenating images. We conducted the measurement as follows.

First, we defined SEM observation parameters when an image is obtained (step S1001). We set the observation magnification to two hundred thousands and the number of integrations to 128.

We then entered the number of images to be concatenated and a distance traveled by the stage in a single operation (step S1002). The number of images is specified to 6. The movement distance per operation is specified to 0 nm in the x direction, i.e., horizontally, and 675 nm in the y direction, i.e., vertically.

The visual field is moved to the bottom end of the gate area to be inspected (step S1003). An image capture start button is pressed to conduct the measurement (step S1004) The system captures a first image based on the parameters specified at step S1001 and stores data in a storage area. Then, in accordance with the parameters specified at step S1002, the system moves the visual field 0 nm in the x direction and 675 nm in the y direction to capture a second image. This operation is repeated to obtain six image data files corresponding to an area of 4.05 µm in total. These image data files are sequentially given names from file 1 to file 6 in the order of capturing the images.

The above-mentioned six files are concatenated in the y direction (step S1005). An SEM monitor can be used during observation of wafers. Alternatively, it may be also preferable to use the SEM monitor after completing the wafer observation using the SEM or to transfer files to an image processing apparatus connected to the SEM and use a terminal of the image processing apparatus. We adopted the third method of using the image processing apparatus. FIG. 11 shows details of the contents at step S1005. First, an image processing apparatus' terminal is operated to configure a new window for image concatenation. On this window, six images are arranged in the direction of height (step S1101). The operator visually checks whether or not a correction of the image position is needed (step S1102). If unnaturalness is not found, the data is integrated as is. If unnaturalness is found, it is possible to correct the positional relationship between image files. The pattern in the connected images should seem to be a pattern with a smooth and continuous edge. Since the files are concatenated slightly irregularly, the positional relationship needs to be corrected. The operator then selects one of two methods of correcting positions of images as follows (step S1103). The first method corrects the positional relationship using a gray scale image unchanged. The operator clicks to activate an image to be moved. Using the mouse or entering coordinates from the keyboard, the operator moves the image vertically and horizontally. The second method detects edge points from all the images according to the same algorithm as for the SEM and displays a set of edge points instead of the original images. When the first method is selected, the image is positioned manually (step S1107). When the second method is selected, the manual or automatic correction is available. When the second method is selected, an edge is represented as a set of edge points instead of the original gray scale image. If the manual correction is to be used, a displacement between images becomes remarkable during concatenation. There is provided an advantage of smoothly concatenating images with ease. We selected the second method here. When an edge display is selected on the monitor, the system provides a screen to set parameters for edge detection (step S1104). Setup operations here are the same as those for the SEM. Upon completion of the parameter input, the line pattern images on the sheet all change to images showing only edges. With this state, each image can be repositioned. It is also possible to display an approximate line for easy identification. The approximate line must be displayed for the automatic correction. It is determined at step S1105 whether or not to display the approximate line here. We selected to display the approximate line here. Parallel lines with a common gradient are used to approximate the right and left edges (12 edges in total here) in all images. The system displays an approximate line having the obtained gradient (one value) and fragments (a total of 12 fragments given to the edges) on the corresponding image. The operator selects whether to manually or automatically correct the positional relationship of the images (step S1106). When selecting the manual correction, the operator moves the images by referencing the displayed approximate lines (step S1107) When selecting the automatic correction, the images automatically move so that 12 parallel lines are smoothly concatenated vertically in units of six lines (step S1108) However, the automatic correction corrects positions in the x direction only, and cannot move images vertically. Here, the operator selects the manual correction to adjust the positional relationship of six images, and then presses the OK button (step S1107). In this manner, the image data is integrated (step S1109). When the automatic correction is selected, the system corrects the positional relationship of the images as mentioned above (step S1108), and then automatically concatenates the image data (step S1109).

The screen then displays the number of pixels and vertical and horizontal lengths of the image data concatenated into one file, and provide an instruction to enter a file name (step S1006 in FIG. 10). The operator enters "newfile1" as the file name, and then presses the OK button. The image data integrated at step S1005 is saved with this file name. This process can be canceled. If the process is canceled, the integrated data is discarded. The process terminates without saving data.

The data "newfile1" is inspected (step S1007). Detailed contents at step S1007 correspond to the process as shown in FIG. 8 described for working example 1. First, parameters are specified at step S801. The operator enters the inspection area length of 4 μm and an allowable error of 10%. The remaining parameters are configured automatically. The screen then displays a concatenated image with the shorter side at the top and a rectangle representing the inspection area. Using the mouse, the operator manipulates positions and intervals of the rectangles so as to cover the edge area (step S802), conducts the measurement (step S803), performs the calculation, and displays the result (step S804). The displayed result contains $w_{av}$=82.3 nm, $w_{max}$=86.6 nm, $w_{min}$=74.2 nm, and $3\sigma_w$=9.5 nm. In this manner, the present invention can be used to find the line width variation with an allowable error specified for the intended area longer than or equal to 1 μm. Likewise, it is also possible to calculate a standard deviation for position fluctuations of each edge or its tripled value, i.e., a so-called edge roughness size instead of the line width variation.

As mentioned in working example 4, the manual correction is used to concatenate the vertically positioned SEM image data so as to eliminate the discontinuity. This technique is mandatory for calculating the edge roughness. However, the strict concatenation is unnecessary for calculating a line width variation. That is to say, it may be preferable to integrate data without correction at step S1102.

Working Example 5

Working example 5 describes a method of further facilitating the measurement conducted in working example 4 above.

Similarly to working example 1, working example 5 inspects a line pattern comprising a polycrystalline silicon corresponding to the transistor gate. In terms of designed sizes, the gate is 80 nm long and 4 μm wide. We set the observation magnification to two hundred thousands and the number of integrations to 128. The operator enters the inspection area length of 4 μm and an allowable error of 10%. The remaining parameters are configured automatically. The measurement interval results in 20 nm. Since this is equivalent to 15.1 pixels, we settled the measurement at a 15-pixel interval. This is equivalent to 34 points per image.

The operator moves the visual field to the measurement start point and conducts the measurement using the automatically configured parameters. The system produces 34 line width values. When the operator clicks a button to record data displayed on the screen, a screen for entering a file name appears. The operator enters "gate1" for the file name. The 34 line width values are sequentially written from the bottom to this file. The operator then manually moves the visual field upward approximately 675 nm to conduct the measurement. The screen shows a message prompting whether to continue recording data, the operator clicks "Yes". The system further records another 34 line width values on file "gate1" that already records data of 34 numeric values.

This operation is repeated six times to record data. The system measures the line width over the area of approximately 4 μm at a 15-pixel measurement interval and records resulting line widths sequentially from the line end onto a file. A statistical process is applied to the result to derive a histogram, an average value, a standard deviation, and the like. The system here displays an average value, a maximum value, a minimum value, and a triple of standard deviation. The displayed results are $w_{av}$=82.0 nm, $w_{max}$=86.6 nm, $w_{min}$=74.0 nm, and $3\sigma_w$=9.3 nm. The present invention can be used to very easily measure the line width variation at a measurement interval specified for an area 20 longer than or equal to 1 μm.

Working Example 6

Figure 12:
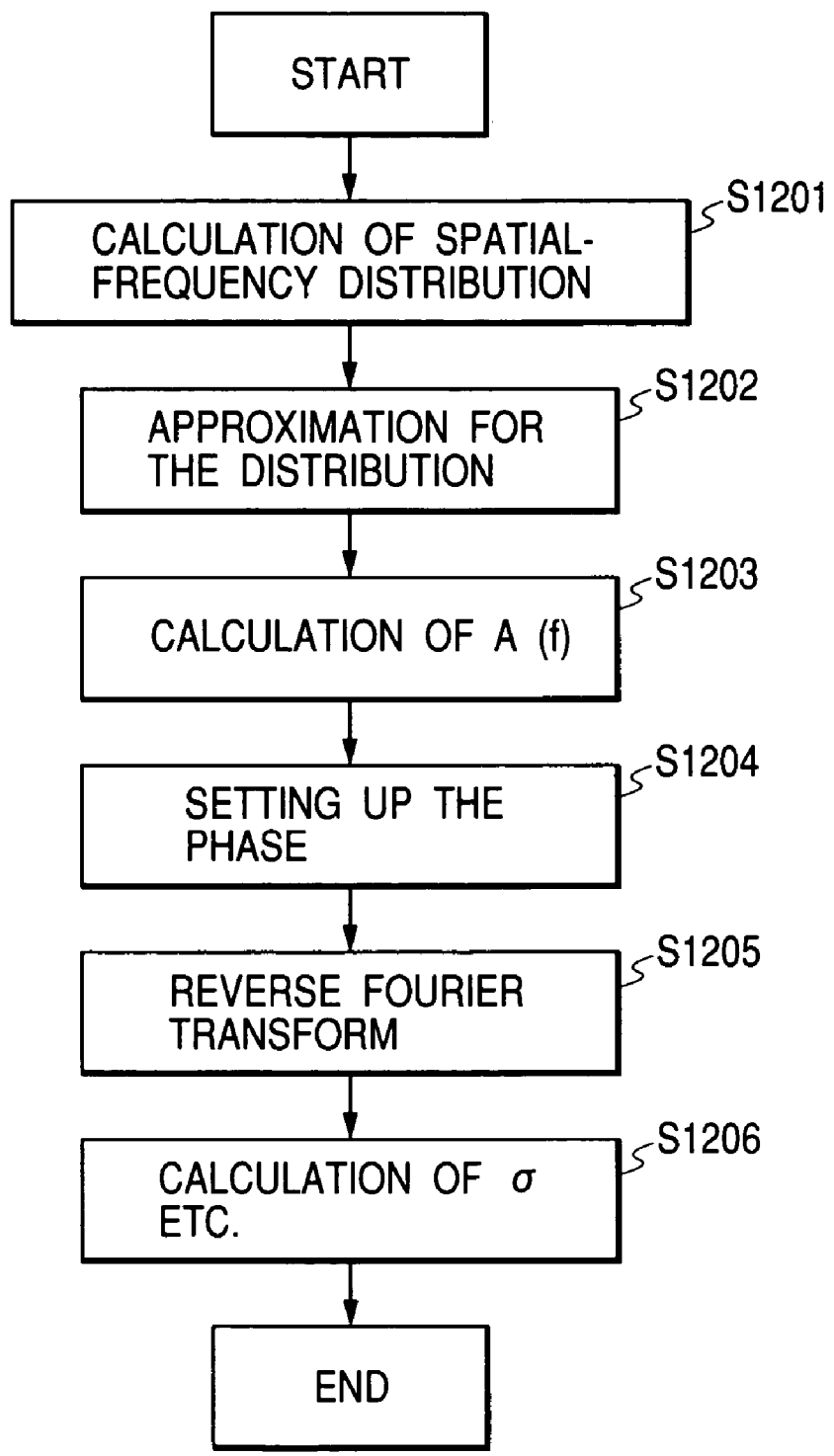
FIG. 12 is a flowchart showing part of the procedure in embodiment 6 of the present invention.

Working example 6 of the present invention will be described with reference to FIG. 12. FIG. 12 is a flowchart showing part of the procedure in working example 6.

Working example 6 observes a line width variation in the line pattern. When the same process is used to create a transistor having a gate width longer than the line length, working example 6 shows an example of estimating a gate length fluctuation occurring at the gate.

We measured a line width variation on a line pattern of 2 μm in length and obtained a pattern image at 100000× magnification for observation. The visual field for the image is 1.35 μm vertically. We calculated line widths at a 2-pixel interval, i.e., a 5.27 μm interval for lines in this image and obtained a series [$w_i$|i=0, 1, 2, . . . , 255] comprising 256 pieces of line width data. We found that the average line width is 103.0 nm and the standard deviation for distribution is 2.7 nm.

When there are line width variations of the same degree, we found the standard deviation for the line width variations occurring at the gate 5.40 μm wide as follows.

We Fourier-transformed the measured data to find the spatial-frequency distribution (step S1201). Working example 6 uses a computer application for fast Fourier transform to find a Fourier coefficient for data as many as 2 raised to the power specified by any exponent and A(f) as its absolute value. An area of 1.35 μm length allows acquisition of the coefficient for spatial frequency f that results in an integral multiple of 1/1.35 (in units of μm$^{-1}$)

The obtained spatial-frequency distribution is approximated with an approximated curve represented as the polygonal line 201 in FIG. 2 (step S1202). Parameter m is set to 0. These functions are provided as (Equation 1) through (Equation4) just for examples. It may be preferable to use the other functions having different function types capable of providing the similar effects. Parameter $f_0$ is set to 5. This process determines a value for fitting parameter $A_0$.

Based on the obtained approximated curve, we then calculated amplitude A (f) for f-components corresponding to the width of the gate whose fluctuation needs to be found (step S1203). The simplest method is adopted here. That is to say, using the value for $A_0$ found in the above-mentioned process and the approximate expression presented in (Equation 3), we calculated A(f) for spatial frequency f that is an integral multiple of 1/1.35 and is not an integral multiple of 1/5.40.

The Monte-Carlo simulation is used to randomly determine a phase for the f-components for which A(f) is calculated in the previous process (step S1204). For example, any integer is generated and is divided by 2π. The remainder can be assumed to be a phase (in units of radians). This makes it possible to obtain Fourier coefficients for all f values within the necessary range.

A reverse Fourier transform is applied to the obtained coefficient to determine a fluctuation in the real space (step S1205).

When there is a roughness equivalent to the measured roughness, the above-mentioned technique is used to obtain data for a line width variation occurring in the area having the line length of 5.40 μm. A standard deviation is calculated from this data. In the case of the line 5.40 μm long, i.e., the gate 5.40 μm wide, the standard deviation for gate length fluctuation is estimated to be 3.3 nm (step S1206).

Parameter m is then set to −0.25. Steps S1202 to S1206 are performed to calculate the standard deviation for gate length fluctuation. The result is 3.8 nm. Accordingly, the standard deviation for gate length fluctuation is estimated to range from approximately 3.3 to 3.8 nm.

In this manner, it is possible to measure a fluctuation for a line longer than the actual gate width and, based on the result, estimate a line edge roughness or a gate length fluctuation for the gate having the original gate width.

If steps S1204 to S1206 are performed more than once to configure the phase, it is also possible to more reliably estimate a degree of roughness that may occur.

Working Example 7

Figure 13:
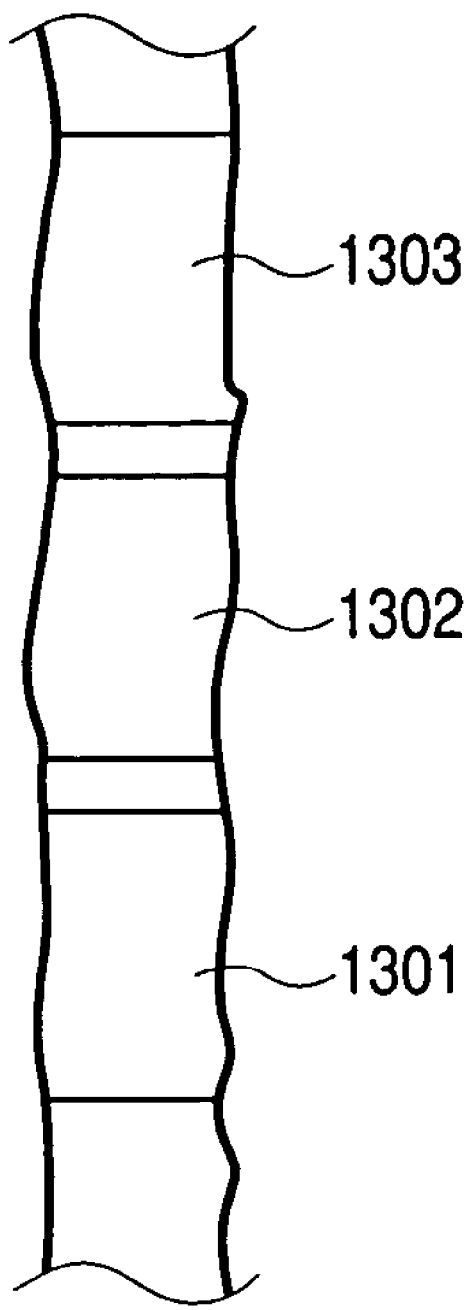
FIG. 13 is a pattern diagram showing a pattern to be measured in embodiment 7 of the present invention.

Referring now to FIG. 13, working example 7 according to the present invention will be described. FIG. 13 is a pattern diagram showing a pattern to be measured in working example 7.

Working example 7 shows an example of calculating an average line width and a line width variation for patterns of different transistors with the same specification on a single line.

The pattern to be measured is a line of 100 μm lengths as shown in FIG. 13. The transistor gate is 0.2 μm wide. Gate patterns 1301, 1302, and 1303 occupy parts of the line and are used for different transistors. FIG. 13 shows that the gate patterns 1301, 1302, and 1303 are arranged on the line. Similar gate patterns are arranged along an elongation of this line.

We measured the line width for the gate patterns as follows. Since the gate width is 0.2 μm, the necessary number of calculations is 2 μm/0.2 μm, i.e., 10 or more. Accordingly, we determined to perform the calculation ten times. The stage is moved to align the center of the gate pattern 1301 to the center of the image. The observation uses a 200000× magnification. The vertical length of the measurement area is set to approximately 0.2 μm. The measurement area is configured to overlap with the gate pattern area along the vertical direction. We then calculated line width $w_1$ and a triple of standard deviation, i.e., $3\sigma_{w1}$ as a standard of the line width variation size. The stage is moved for similar measurement about the gate pattern 1302 to obtain $w_2$ and $3\sigma_{w2}$. The measurement is continued for the gate pattern 1303 and the other gate patterns along the elongation to obtain measurement results about a total of 10 gates such as $w_1, w_2, \ldots,$ and $w_{10}$, and $3\sigma_{w1}, 3\sigma_{w2}, \ldots,$ and $3\sigma w_{10}$. These numeric values are used to find average line width $w_{av}$ and line width variation $3\sigma_{wav}$ for the gate patterns as follows.

$$w_{av} = \frac{1}{10}\sum_{i=1}^{10} w_i \qquad \text{[Equation 11]}$$

-continued $$3\sigma_{wav} = 3 \cdot \sqrt{\frac{1}{10}\sum_{i=1}^{10} \sigma_i^2}$$ [Equation 12]

Line width $w_{av}$ results in 110.2 nm. Line width variation $3\sigma_{wav}$ results in 7.0 nm. When the total measurement area length is set to 2 μm or more, it is possible to obtain reliable numeric values by minimizing variations of values themselves in sizes and size variations depending on pattern positions.

Working Example 8

Figure 14:
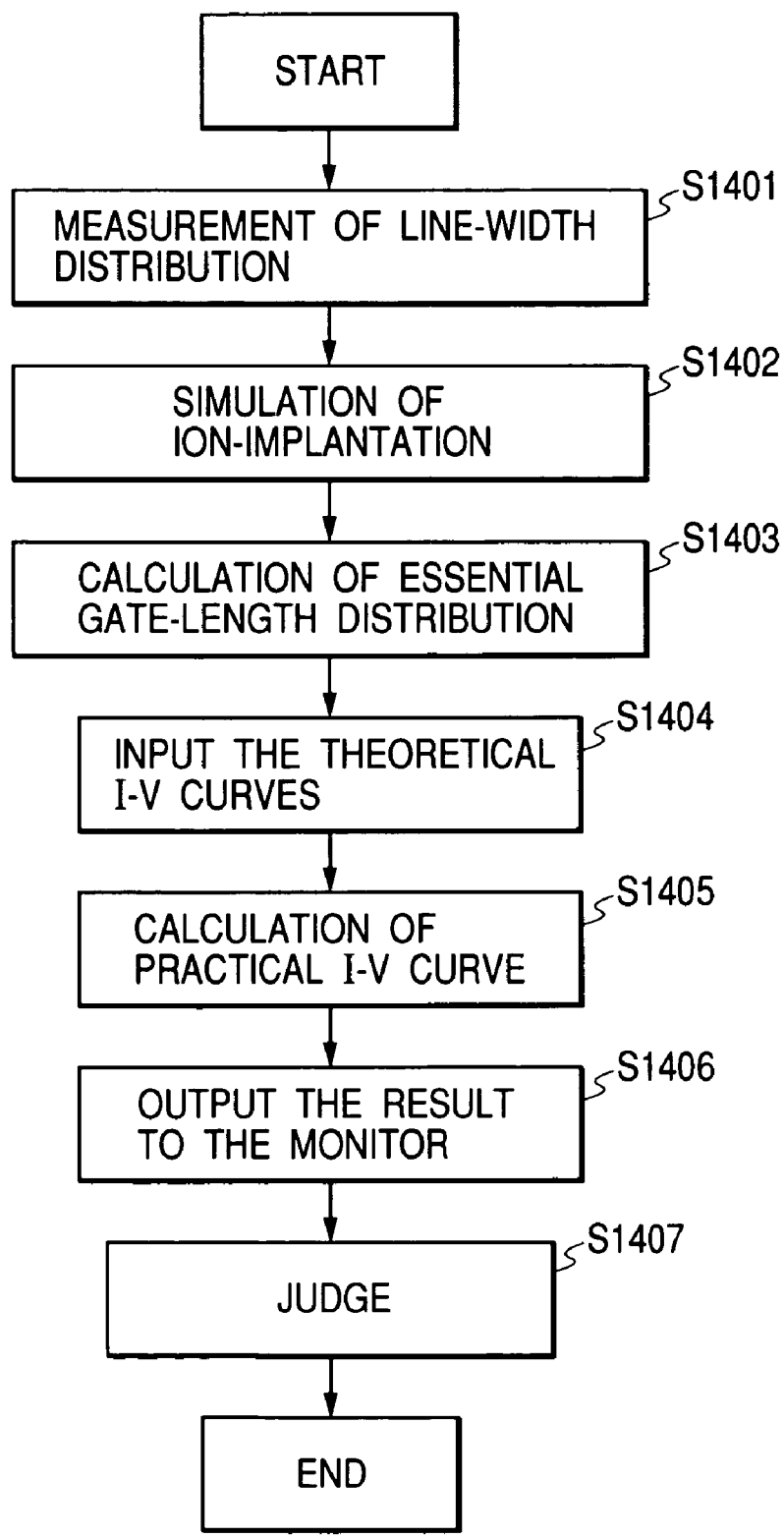
FIG. 14 is a flowchart showing part of the procedure in embodiment 8 of the present invention.

Referring now to FIGS. 8 and 14 above, working example 8 according to the present invention will be described. FIG. 14 is a flowchart showing a procedure of working example 8. FIG. 8 shows part of the flowchart in detail.

Working example 8 estimates electrical characteristics of a completed device based on data obtained in working example 1 and inspects the pattern based on the estimated electrical characteristics.

The operator observes a line pattern on the wafer using the SEM and evaluates the obtained image according to the procedure in FIG. 14 to determine the quality of the wafer.

The operator performs the process in FIG. 8 as described in working example 1 to calculate a line width variation in the image (step S1401). The observed wafer's history, original image, and parameters used are the same as those described in working example 1. The obtained values are displayed as $w_{av}$=80.3 nm, $w_{max}$=85.6 nm, $w_{min}$=74.0 nm, and $3\sigma_w$=9.0 nm. We also obtained the line width distribution by measuring 76 points $\{w_i|i=0, 1, 2, \ldots, 75\}$.

We then simulated the ion implantation for the line width distribution data (step S1402). If the gate pattern has a roughness, it does not necessarily directly become the electrical gate length distribution after the ion implantation. We supposed a case of minimizing the diffusion of ions by annealing after the ion implantation and assumed that the distribution of line widths $\{w_i|i=0, 1, 2, \ldots, 75\}$ directly becomes the distribution of gate length $L_g$.

We then compiled the line width data as the $L_g$ distribution to calculate the gate length distribution (step S1403). Here, it is possible to select how to approximate the distribution of $L_g$ values obtained at step S1402. The approximation is categorized into the following five types. (1) All $L_g$ values are assumed to be average value $w_{av}$. (2) All $L_g$ values are assumed to be $w_{av}-n\sigma_w$. Any real numeric values such as 1, 1.5, 2, and 3 can be assigned to value n. (3) The $L_g$ values are assumed to take $w_{av}-\sigma_w$ for a half of measurement points (M/2) and $w_{av}+\sigma_w$ for the remaining half. (4) The $L_g$ distribution is assumed to be a normal distribution of sum total M, average value $w_{av}$, and standard deviation $\sigma_w$. (5) The $L_g$ distribution is assumed to be converted into a histogram from the $L_g$ values obtained at step S1402 in increments of the specified $L_g$ value.

We adopted type (5). Types (4) and (5) make it necessary to enter a line width increment, minimum, and maximum data values for calculations. We set the minimum value to 72 nm, the maximum value to 86 nm, and the increment to 1 nm. Accordingly, the line width distribution can be represented as a set $\{(L_{gi}, N_{gi})|i=0, 1, 2, \ldots\}$.

In this representation, $L_{gi}$=72+i. $N_{gi}$ is a frequency of line widths within the range of greater than or equal to $L_{gi}$−0.5 and less than $L_{gi}$+0.5.

We then entered I-V characteristic data of the device when there is no gate length distribution (step S1404). The I-V characteristic data represents relationship between gate voltages Vg and drive current Id when there is no gate length distribution, i.e., $L_g$ is constant. Generally, a data set is stored in an apparatus' storage area. During use, the operator displays the corresponding file names and selects an intended one. When a data set to be used is not stored in the apparatus' storage area, such data set can be input from a storage area of a computer connected to the apparatus or a disk drive, a CD driver, and the like attached to the apparatus. We selected a file with product name A having gate length of 80 nm out of files stored in an apparatus' storage area. The file contains I-V characteristics for $L_g$ ranging from 60 to 100 nm when drive voltage Vd is set to 0.05 V and 1.2 V. The I-V characteristic for each $L_g$ value can be expressed as follows.

$$I_d=f(L_g; V_g)$$ [Equation 13]

$L_g$ values in the file are incremented by 1 nm. $V_g$ values in data corresponding to the $L_g$ values are incremented by 0.02 V from −0.5 V to +1.5 V.

The I-V characteristics are calculated when the gate length distribution is available (step S1405). When the device is fabricated from the observation pattern, an I-V curve for the device is calculated from information about the $L_g$ distribution based on the SEM image obtained at step S1403 and the I-V characteristic data when the roughness obtained at step S1404 is not available. Output data $\{(V_{gi}, I_{di})|i=0, 1, 2, \ldots\}$ is calculated from the input $L_g$ distribution data $\{(L_{gj}, N_{gj})|j=0, 1, 2, \ldots\}$ as follows.

$$I_{di} = \sum_j N_{gj} \cdot f(L_{gj}; V_{gi})$$ [Equation 14]

This calculation is performed for the $L_g$ distribution found at step S1403 to obtain I-V curves for Vd set to 0.05 V and 1.2 V corresponding to the distribution. Since only type (5) is selected here, one type of I-V curve is obtained for each $V_d$.

The calculation result is output (step S1406). There are three types of output forms: (1) I-V curve; (2) off-current (Id when $V_g$=0); and (3) threshold voltage. We selected (2) and (3) here and displayed the values for the $L_g$ distribution specified at step S1403 on the screen. Thereafter, we displayed a result of comparing these values with a result when the line width takes only value $w_{av}$. The result shows how much the off-current value is multiplied against a reference value that allows $L_g$ to equal the designed value, i.e., 80 nm at all measurement points. The result also shows how much the threshold voltage decreases. According to the indications, the off-current value is multiplied by 1.9, and the threshold voltage decreases by 4 mV.

Then, we determined the quality or the grade of a wafer under inspection (step S1407). The determination is based on criteria whether or not an off-current value is smaller than the reference value twice or more and whether or not a decrease in the threshold voltage is 20 mV or less. Since the determination of the image resulted successfully, the wafer was transferred to the next process. Thus, the inspection of the wafer completed. While the operator makes the determination here, there may be an alternative. That is to say, an allowable range is input in advance. The system can be configured to generate an alarm if the off-current value and the threshold voltage exceed the range.

At step S1403, it may be useful to consider the results obtained by selecting the above-mentioned types (1) through (3) for reference. However, it is desirable to use the type (4) or (5) for actual pattern inspection. Type (5) enables more accurate inspection. It may be preferable to select type (4) when the inspection time must be shortened or a large amount of images needs to be processed at once.

In this manner, it is possible to efficiently conduct a high-accuracy inspection.

Working Example 9

Figure 15:
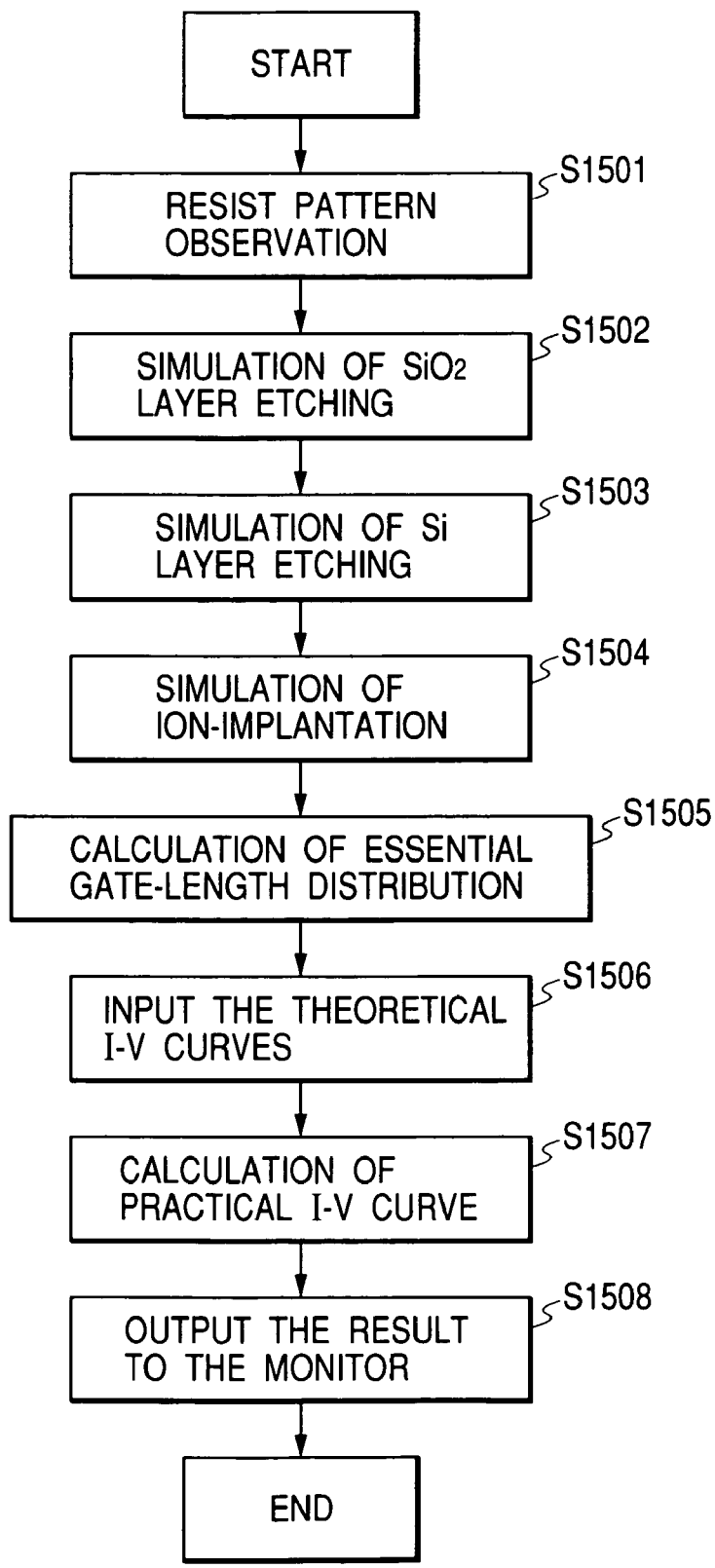
FIG. 15 is a flowchart showing part of the procedure in embodiment 9 of the present invention.
Figure 16:
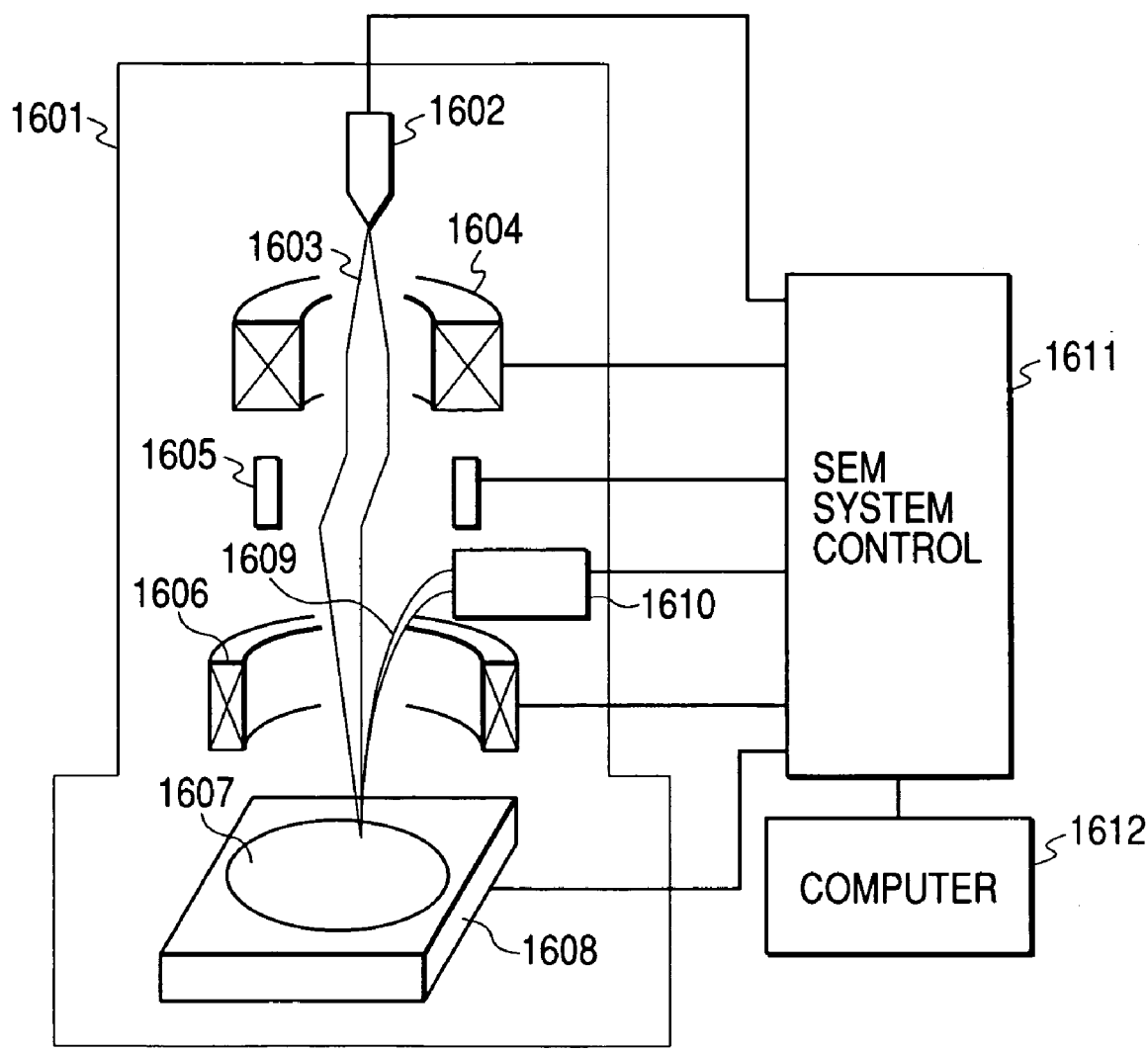
FIG. 16 shows a pattern inspection system configuration in embodiment 9 of the present invention.

Referring now to FIGS. 15 and 16, working example 9 according to the present invention will be described. FIG. 15 is a flowchart showing a procedure of working example 9. FIG. 16 shows a configuration of the pattern inspection system to implement working example 9.

Working example 9 exemplifies the pattern inspection system configuration and the inspection process capable of highly accurately inspecting resist patterns in a short time using the present invention.

As shown in FIG. 16, the pattern inspection system according to working example 9 uses a scanning electron microscope (SEM). The system comprises a body 1601; an electron gun 1602; a convergent lens 1604; a deflector 1605; an objective lens 1606; a stage 1608; a detector 1610; and a control section of the scanning electron microscope. The electron gun 1602 scans and irradiates an electron beam 1603 as an ion beam to a sample 1607. The detector 1610 detects an intensity distribution of secondary electrons 1609 or reflected electrons from the sample 1607. The system displays an observed image in synchronization with the electron beam 1603.

Working example 9 inspects a resist line pattern corresponding to the transistor's gate area.

The operator mounts the sample 1607 having a resist pattern to be inspected on the stage 1608. By controlling operations from the SEM's control section 1611, the operator observes the pattern and obtains an image (step S1501). The image data is transferred to the computer 1612 connected to the apparatus to detect edge points using predetermined parameters.

The computer 1612 performs calculations. The computer performs a simulation of etching a silicon dioxide layer as the resist under-lying layer with respect to a set of edge points (step S1502). The simulation may represent an etching process on the atomic or molecular level. The simulation used for the inspection process preferably can be used to estimate changes in the absolute amount of line width fluctuations and the spatial-frequency distribution thereof after the etching based on the data that has been stored so far. This aims at reliably reflecting the past achievements and shortening the calculation time. In this manner, it is possible to output the state of a set of edge points on the silicon dioxide layer pattern after the etching.

The simplest estimation method is used here and is described below. First, the edge point set $\{x_i|i=0, 1, 2, \ldots\}$ is used to find an approximate line for the right and left edges and an edge point fluctuation $\{\Delta x_i|i=0, 1, 2, \ldots\}$. The length of the approximate line for the right and left edges is extended by multiplying the original value, i.e., the average line width of the resist pattern by a. The result is used as the approximate line for edges on the silicon dioxide layer pattern. In addition, the edge point fluctuation is multiplied by b to be used as an edge point fluctuation of the silicon dioxide layer pattern. Then, the edge point fluctuation of the silicon dioxide layer pattern is added to points on the obtained approximate line for edges of the silicon dioxide layer pattern to determine edge point positions for the silicon dioxide layer pattern. The condition here is a=0.80 and b=0.95.

Then, the dry etching is conducted by using the silicon dioxide layer as a mask for simulation of processing the under-lying gate layer, i.e., the silicon layer (step S1503). Like step S1502, there is available a method of using a commercially available process simulator for the simulation. Alternatively, it is possible to use the simple method of multiplying only the line width and the fluctuation by an integer based on the stored data. Here, like the simple method as described at step S1502, it is assumed to multiply the line width by 0.98 and the edge point fluctuation by 0.9.

Then, an ion implantation process is simulated (step S1504). Also like step S1502, the simulation may follow a time-consuming method of using a commercially available process simulator or finding solutions to diffusion equations or a simple method of multiplying the line width and the line width variation by integers. Using a frequency filter, the line width variation is converted into the frequency of 100 $\mu m^{-1}$ or more, i.e., a cycle to remove fine vibration components of 10 nm or less. The cycle is then returned in the real space. The line width variation is multiplied by 0.95 by keeping the average line width unchanged.

The operator then calculates the distribution of the gate length $L_g$ based on the edge point data obtained at step S1504 (step S1505). The operator needs to select either of the following two types of distributions. The first method is to create a histogram of gate length $L_g$ from the data obtained at step S1504. The second method determines the distribution of $L_g$ using a normal distribution function created from the average line width and standard deviation a for the line width distribution. In either case, the distribution is obtained as a set of frequency $N_{gi}\{(L_{gi}, N_{gi})|i=0, 1, 2, \ldots\}$ for gate length $L_{gi}$.

The I-V characteristic data is input when there is no gate length distribution, i.e., no line width variation (step S1506). The data is selected from a file stored in the apparatus' storage area or is input from an external input apparatus.

The I-V characteristics are calculated when the gate length distribution is available (step S1507). The system uses the $L_g$ distribution obtained at step S1505 and the I-V characteristic input at step S1506 to calculate an ideal I-V characteristic with no $L_g$ distribution and with dimensions provided as designed and an I-V characteristic estimated for a device to be created from the pattern under inspection.

The system outputs a calculation result (step S1508) The system compares the ideal I-V characteristic with the I-V characteristic estimated from the inspection pattern. The system displays off-currents for the both, a ratio between them, threshold voltages for the both, a difference between them, and the like. Further, the system determines whether or not these results fall in the predetermined allowable range. When the results are outside the allowable range, the system generates an alarm by means of indications on the monitor screen of the computer 1612 or an audible sound.

Unlike the other cases of the line width variation, an effect of the line width variation on the device depends on product specifications such as the gate length and the like. The pattern inspection method the pattern inspection system described in working example 9 can provide highly reliable inspections suited for respective products in a short time.

Working Example 10

Figure 17:
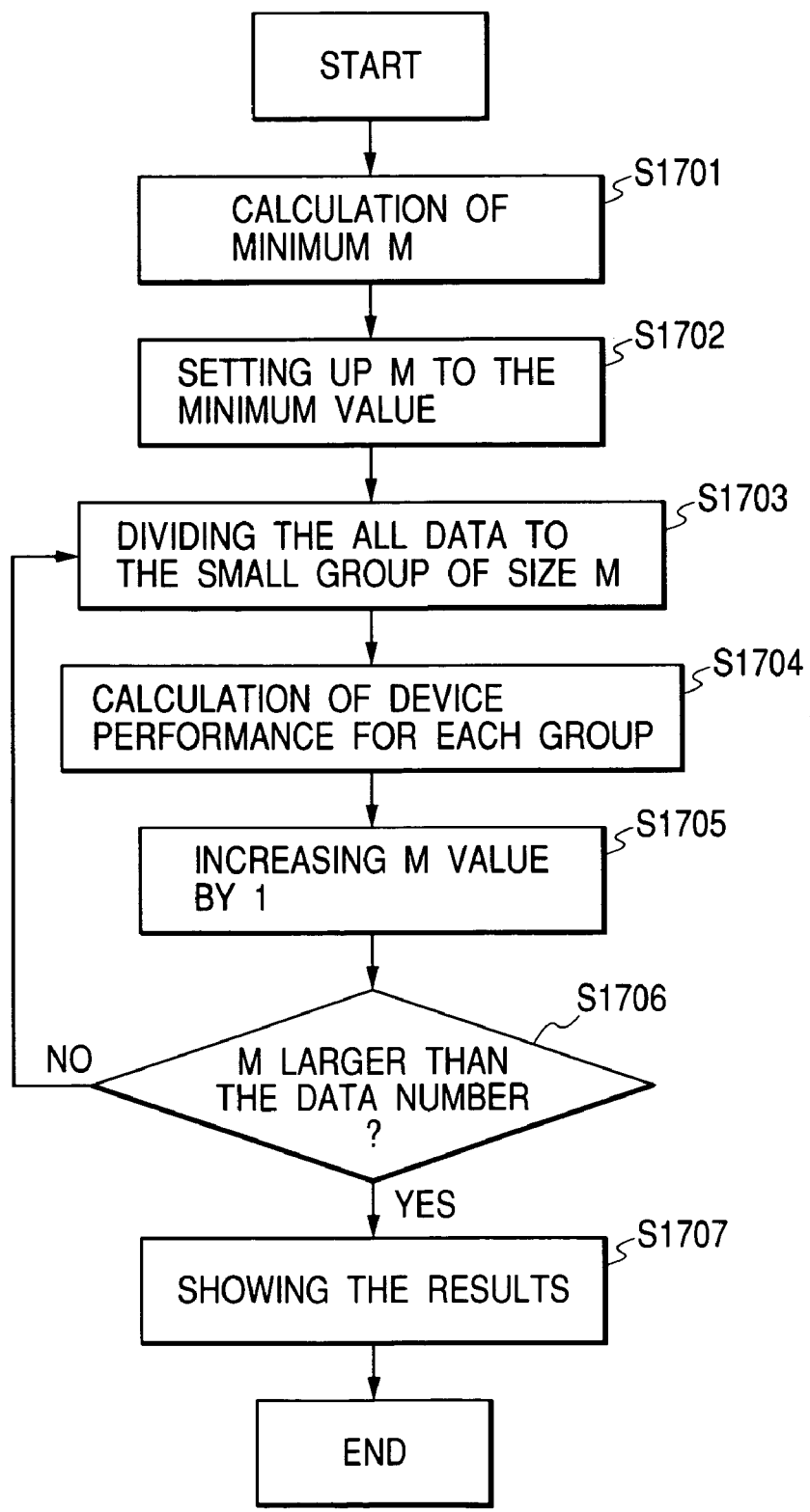
FIG. 17 is a flowchart showing part of the procedure in embodiment 10 of the present invention.
Figure 18:
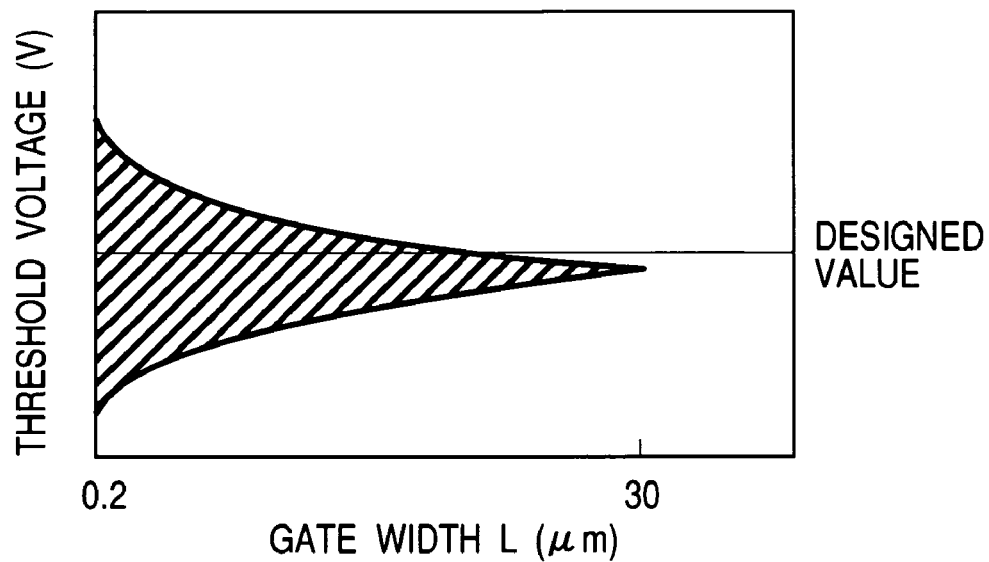
FIG. 18 is a graph showing a result obtained from embodiment 10 of the present invention.

Referring now to FIGS. 17 and 18, working example 10 according to the present invention will be described. FIG. 17 is a flowchart showing a process of calculating the device performance in working example 10. FIG. 18 is a graph showing a result obtained in working example 10.

Working example 10 shows an example of simultaneously estimating transistor's performance degradation and dependence of performance variations on the gate width by using the present invention.

Working example 10 observes a line pattern of 30 μm in length. However, the transistor whose performance needs to be estimated has the minimum gate width of 0.2 μm.

The observation uses a 200000× magnification. An allowable error is set to 5%. The equations presented as (Equation 7) through (Equation 10) are used to determine parameters such as a measurement interval. When a calculation uses $f_0=5$ and $m=0$, the measurement interval must be 10 nm or less with reference to the gate width of 0.2 μm. Since one pixel is equivalent to 675 nm divided by 512 pixels, i.e., approximately 1.318 nm, the 10 nm interval is equivalent to approximately 7.6 pixels. We determined the measurement at a 7-pixel interval (length of approximately 9.2 nm). One image uses 73 pieces of data that is equivalent to an area of 673.7 nm in length. We observed the sample using the SEM according to the method described in working example 5. Starting from the end of the pattern under observation, we repeated a process of obtaining line width data from one image and moving the visual field 44 times to obtain line width variation data over an area of 29.6 μm in total. The file contains a total of 3212 pieces of data.

The following calculations are performed for this data to estimate the transistor performance degradation and variation corresponding to the gate width.

The system calculates a minimum value for data length (the number of pieces of data) M corresponding to the minimum gate width (step S1701). Since the measurement interval is 9.2 nm, ten pieces of data correspond to one transistor having the gate width of 92 nm, for example. Since the minimum gate width is 200 nm in this example, the minimum value for M is 21.

The system then starts the calculation by setting M to the minimum value found at step S1701 (step S1702).

The system divides 3212 pieces of data from the end into a group of M pieces of data (step S1703). When M=21, there are provided 152 groups. The last group contains a residue of 20 pieces of data. The residual data is not used for the calculation.

With respect to all groups obtained, each group is assumed to be data of gate length fluctuation for one transistor. According to the method described in working example 8, the system finds the transistor performance such as a threshold voltage or an off-current (step S1704). Since there are as many transistors as the number of groups, transistor performance values are found for the number of groups.

The value for M is incremented by 1 (step S1705). It is determined whether or not M exceeds the total number of data (step S1706). If M does not exceed the total number of data, the process returns to step S1703 and repeats the same. If M exceeds the total number of data, the calculation terminates. The system displays the transistor performance and the dependence of variations on the gate width (step S1707).

FIG. 18 shows an example of the result obtained in this manner. In the graph, the abscissa represents the gate width calculated from M. The ordinate represents the threshold voltage. The abscissa is plotted logarithmically. The shaded portion represents a distribution area of threshold voltages. The distribution area of threshold voltages is configured to a range so as to enable the cumulative frequency distribution from 10% to 90%. That is to say, the area covers 80% of all transistors. While the cumulative frequency distributions are set to 10% and 90%, any other values can be specified. Even if the transistor's average gate length complies with the designed value, a fluctuation decreases the threshold voltage. As M increases, the threshold voltage converges on a value smaller than the designed value. The designed value in FIG. 18 is equivalent to a threshold voltage of a transistor whose gate width represents an average value of all data and shows no distribution. While the example here shows the transistor performance in terms of the threshold voltage, the same graph can be also represented with off-currents. While the example uses the area along the ordinate to represent the transistor performance distribution, it is also possible to calculate a histogram for each value of M and show the transistor performance distribution using a three-dimensional graph.

According to the above-mentioned result, it is possible to estimate the performance degradation and variations due to a gate length variation when the transistor having gate width L is fabricated through the same process as that for fabricating the sample under observation. In other words, it is possible to evaluate materials or processes for fabricating transistors. When there is provided an allowable value for performance degradation, it is possible to estimate a variation and a ratio of transistors that may not satisfy the specifications. While the example here uses the 30 μm line as a pattern under observation, data for a longer area will provide more reliable results. However, widening an observation area may involve factors other than a spontaneously generated roughness such as effects of peripheral patterns or unevenness of the under-lying layer thickness. A proper observation area is approximately 100 μm or less.

Working Example 11

Figure 19:
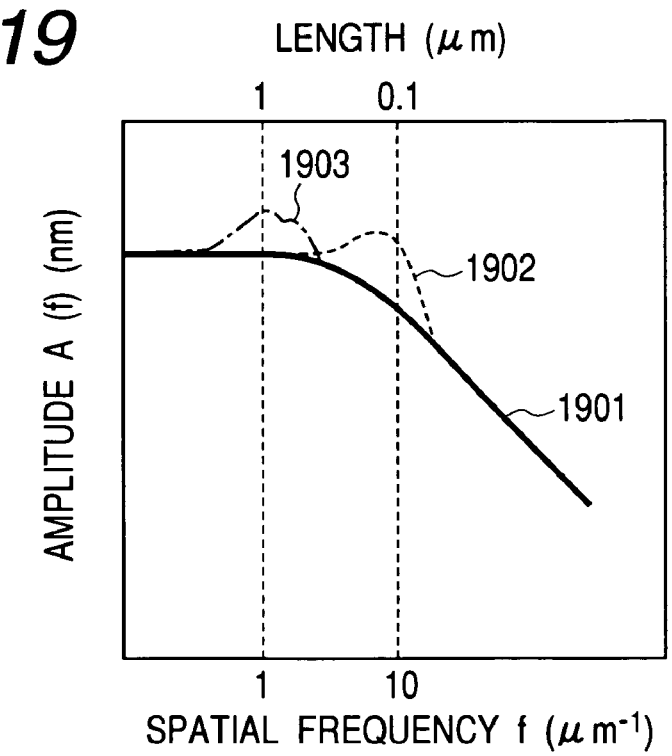
FIG. 19 is a graph showing a spatial-frequency distribution of pattern edge roughness measured in embodiment 11 of the present invention.

Referring now to FIG. 19, working example 11 according to the present invention will be described. FIG. 19 is a graph showing the spatial-frequency distribution of line edge roughness measured in working example 11.

Working example 11 shows an example of monitoring the process by measuring roughness shapes in detail.

We measured the line edge roughness of a resist used for the semiconductor manufacturing process. We found that the best focus causes a small roughness during exposure, but a defocus causes a very large roughness. After investigating the spatial-frequency distribution, we found that the best focus causes a curve 1901 and a defocus causes a curve 1902. The curve 1902 shows a peak characteristic of the spatial frequency band ranging from 5 $\mu m^{-1}$ to 10 $\mu m^{-1}$. Using the calculation method according to the present invention, we measured the roughness as follows to detect a defocus of a photolithography machine.

The visual field must be 200 nm or more in order to observe a cycle of approximately 200 nm. Too high a magnification for the observation causes many noises or increases changes in the image due to charge-up phenomenon. In consideration for these, the observation uses a 200000× magnification so that one side becomes 675 nm. According to the calculation of the present invention, a measurement interval is set to 10 nm or less so that a component at 100 nm cycle can be detected with an allowable error of 10%. Since the equivalent number of pixels is 7.6, the measurement interval is set to 7 pixels. The averaging parameter is set to 7.

Based on the above-mentioned conditions, we conducted an inspection that detects an edge shape of the resist line pattern 200 nm long and expresses a degree of edge roughness in 3σ, i.e., a triple of standard deviation σ in the edge position distribution. Using the present invention, we determined ten measurements per pattern. We found a root mean square for the obtained ten 3σ values and used a result as 3σ for the observation sample. When the photolithography machine defocuses, value 3σ increases abnormally. By using this characteristic, it is possible to monitor photolithography machine states during the inspection process.

We measured the edge roughness for the line pattern comprising the silicon on the pattern after the dry etching. We found a sensitive change in the degree of edge roughness, i.e., 3σ for the edge position distribution in response to a flow volume for the kind of the gas used for the dry etching. After examining the spatial-frequency distribution, we also found the following. The best condition generates the curve 1901. However, if a specific kind of the gas easily changes the flow volume and is subject to a decrease in the flow volume, a characteristic peak appears near 1 μm$^{-1}$ like the curve 1903 to increase 3σ. We measured the roughness as follows using the calculation method according to the present invention and detected an abnormal flow volume of the gas in a dry etching apparatus.

Like the above-mentioned case, we selected an observation magnification in order to observe a cycle of approximately 1 μm. As a result, we determined a 100000× magnification for the observation. In order to detect unevenness at a 1 μm cycle, we performed the calculation according to the present invention and determined a measurement interval of 20 nm or less using $f_0$=5 and m=0. Since a value of 20 nm is equivalent to 7.6 pixels in a 100000× image, we defined the measurement interval to be 7 pixels-and the averaging parameter to be 7, also.

Based on the above-mentioned conditions, we conducted an inspection that detects an edge shape of the line pattern 1 μm long and expresses a degree of edge roughness in 3σ, i.e., a triple of standard deviation σ in the edge position distribution. Using the present invention, we determined five measurements per pattern. We found a root mean square for the obtained five 3σ values and used a result as 3σ for the observation sample. When the dry etching apparatus is subject to a decrease in the flow volume of a specific kind of the gas, value 3σ increases abnormally. By using this characteristic, it is possible to have dry etching apparatus states during the inspection process.

As mentioned above, the use of the present invention facilities an inspection in the inspection process and makes it possible to monitor the process in a short time.

While there have been described specific preferred embodiments of the present invention made by the inventors, it is to be distinctly understood that the present invention is not limited thereto but may be otherwise variously embodied within the spirit and scope of the invention.

While the embodiments have described the inspection of fine patterns on the semiconductor substrate, the present invention is not limited thereto. The present invention is also applicable to patterns made of the other materials.

The following summarizes potential features of the invention disclosed in this application.

(1) It is possible to calculate parameters for measuring the line edge roughness and dimensional variations in fine patterns.

(2) It is possible to estimate the performance of a completed device by means of the scanning microscope observation, i.e., a nondestructive inspection, of fine patterns.

(3) It is possible to determine the pattern quality or grade by estimating values concerning the device performance from a pattern under observation and comparing the estimated values with a designed value or a predetermined allowable range.

(4) It is possible to provide a highly reliable pattern inspection in a short time and improve the product yield or throughput by using the technique according to the present invention for inspections in the semiconductor manufacturing process.

Working Example 12

Figure 20:
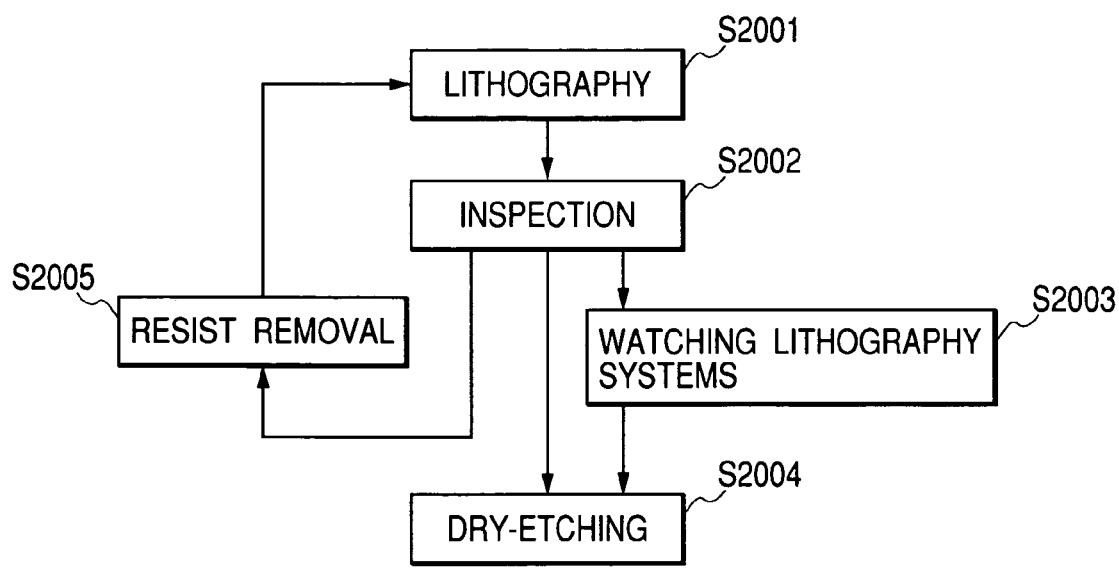
FIG. 20 is a flowchart of working example 12.
Figure 21:
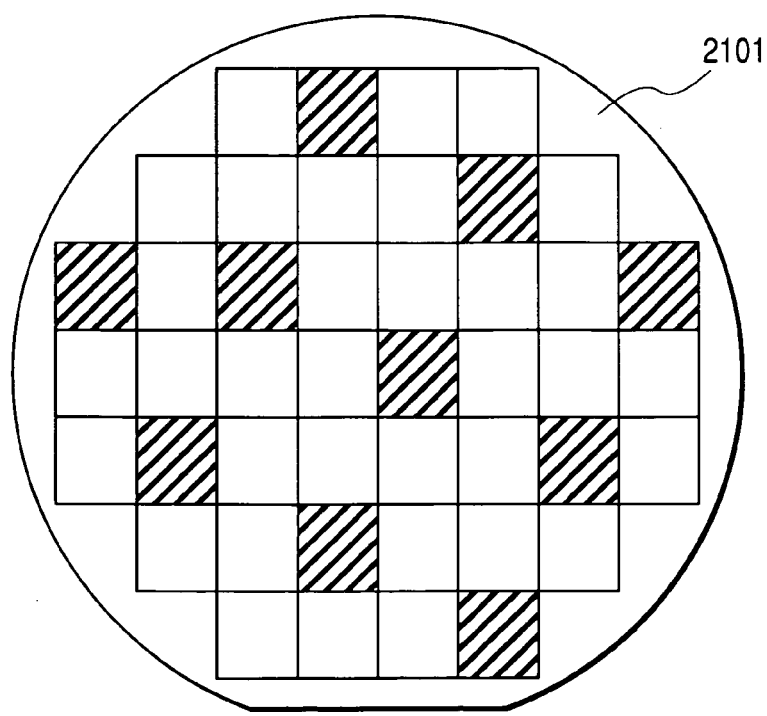
FIG. 21 shows locations of inspected chips.

FIG. 20 is a flowchart showing a procedure of working example 12. Step 2001 (S2001) is a lithography process. Step 2002 (S2002) is the inspection process which includes the present invention. Step 2003 means warning based on the inspection results. Step 2004 is a dry-etching process. Step 2005 is a re-cycling procedure which consists of resist removal and following wafer cleaning. FIG. 21 shows locations of the inspected chips indicated by shading. FIG. 22 is the obtained table of inspection results appearing on the SEM display.

Working example 12 describes an example of performing the inspection using the present invention in the semiconductor-manufacturing process. Especially, it describes an example of deciding to pass or fail the processed wafer after lithography, and of feeding back the inspection results to keep the condition of lithographic tools.

First, fine resist patterns of semiconductor devices are formed onto the wafer by lithography process (S2001). The processed wafer is set to the SEM system and the inspection (S2002) starts. Observed patterns are ten patterns located at the specified relative coordinates of the specified chips (shaded rectangles in FIG. 21) on the wafer (2101). They are isolated line patterns whose line width is about 80 nm and whose length is about 10 μm. In this inspection (S2002), CD (critical dimension, here it means an average of line width) and LWR (line width roughness, here it means three times of the standard deviation of local line width distribution) is measured at the ten areas.

LWR and CD are calculated as follows. The concrete method is similar to the step 804 (S804) in the working example 1. Nevertheless, the inspection-area length is 2 μm and the number of measurement points is 160 in this working example. First, 160 edge points are detected for each left and right edge of the line. And 160 values of local line-width are obtained by calculating distance of the left and right edge points on the same SEM signal profile. LWR is three times of the standard deviation of the 160 values of line width. And CD is the average of the 160 values of line width.

After ten CD-values and LWR-values are obtained, the following three items are checked. First item is the CD-values. The first condition to pass the wafer is that all of the values are in the range of 80 nm ±5 nm. Second item is the LWR-values. The second condition is that all the LWR-values are below 5 nm. Third item is variation of ten CD-values. CD-variation is here defined as three times of the standard deviation of ten CD-values. The third condition is that the value of CD-variation is below 10 nm. The wafer which satisfies the all three conditions is directly sent to the step 2004 (S2004). The wafer which does not satisfy the first or the second condition is sent to the step 2005 (S2005) and re-cycled. When the wafer satisfies the first and the second condition but does not satisfy the third condition, the step 2003 is performed. In the step 2003, the warning message to check and watch the condition of lithographic tools is displayed. It is because large CD-variation often means instability of system condition of the lithographic tools. After that, the wafer itself is sent to the step 2004.

FIG. 22 is the example table of results. The result for each measured point is shown in the matrix 2201. The total results are shown in the bottom part of the matrix and the lines 2202. Here, designed CD has been input in advance. It is the "Designed CD" in FIG. 22 (here, it is 80 nm). The value of "CD Variation" means the CD-variation described above, and the value of "Deviation from the designed CD" is three times of the standard deviation of CD values from the designed CD (not from the average of ten CD-values). The example wafer satisfies the first and the second conditions, however, does not meet the third condition. Therefore, the warning message appears in the SEM display and then the wafer is sent to the dry-etching.

Hitherto, only CD has been measured in pattern-inspection steps. In addition, the CD has been evaluated in a small inspection area. Therefore, appearance of no good semiconductor chip caused by "edge roughness" cannot be prevented. Furthermore, even the CD value cannot tell the real variation caused by shot-condition fluctuation or wafer unevenness, etc. The present invention enabled us to measure CD and CD variation with high accuracy, to measure roughness, and then to detect the bad chips in advance. Failed wafers are re-cycled and production efficiency becomes higher.

In accordance with this working example, a method of manufacturing a semiconductor integrated circuit device comprises forming resist patterns having line patterns on a wafer by a lithography process measuring a plurality of edge positions on said line patterns located at specified relative coordinates on said wafer; calculating a critical dimension and a line width roughness of said line patterns in a measurement area from a measured result of said edge positions; and determining the quality of said resist patterns on said wafer by comparing said critical dimension and said line width roughness of each of said line patterns with a predetermined range and a predetermined criterion; wherein said wafer is sent to the step of a dry-etching process if a condition is met that every critical dimension of said line patterns is within said predetermined range and every line width roughness of said line patterns is below said predetermined criterion; or wherein said wafer is sent to the step of a re-cycling procedure which consists of resist removal if a condition is met that at least one critical dimension of said line patterns is over said predetermined range or at least one line width roughness of said line patterns is above said predetermined criterion.

In a further embodiment of the method of manufacturing a semiconductor integrated circuit device, a plurality of edge positions on each of said line patterns are measured on condition that formula L*N is greater than or equal to 2 μm wherein L equals the length of a line pattern inspection area, and N equals a number of line edge positions measurements.

What is claimed is:

1. A pattern inspection method comprising:
    setting a measurement area length (L2), when an inspection area length (L1) of a line pattern formed on a substrate measures 1 μm or more, by assuming the inspection area length (L1) multiplied by 0.5 or more to be the measurement area length (L2) and,
    also by assuming that when the inspection area length (L1) measures 0.5 μm or less, that the inspection area length (L1) is equal to the measurement area length (L2); and
    also by assuming that when the inspection area length (L1) equals greater than 0.5 μm to less than 1 □m that the measurement area length (L2) is 0.5 μm;
    measuring a plurality of edge positions and/or line widths on the line pattern in the measurement area length (L2) using an ion beam based scanning microscope on the basis of two-dimensional distribution data information about a reflected electron intensity or a secondary electron intensity obtained by observing the line pattern; and
    calculating unevenness of the edge on the line pattern in the inspection area length (L2), or calculating the line width, or calculating a variation in the line width from a measured result of a position of the edge or from the line width measured.

2. A pattern inspection method comprising:
    calculating a maximum range ($\Delta y_{max}$) of a measurement interval ($\Delta y$) along an inspection area length (L) of a line pattern based on the inspection area length (L) of the line pattern formed on a substrate and a user defined allowable error (p);
    measuring a plurality of edge positions or line widths on the line pattern at a selected interval within the maximum range ($\Delta y_{max}$) that is smaller than or equal to the maximum range ($\Delta y_{max}$) of the measurement interval using an ion beam based scanning microscope on the basis of two-dimensional distribution information about a reflected electron intensity or a secondary electron intensity obtained by observing the line pattern; and
    calculating unevenness of the edge on the line pattern in the inspection area, or calculating the line width, or calculating a variation in the line width from a measured result of a position of the edge or the line width measured.

3. The pattern inspection method according to claim 2,
    wherein the maximum range ($\Delta y_{max}$) of a measurement interval is calculated based on the user defined error (p), the inspection area length (L), a first spatial frequency distribution parameter of line edge roughness ($f_0$), and a second spatial frequency distribution parameter of line edge roughness (m);
    wherein the maximum range ($\Delta y_{max}$) is approximated according to p*L when the inspection area length (L) is smaller than 0.1 μm;
    wherein the maximum range ($\Delta y_{max}$) is approximated according to $p*(1/f_0)*L^n$, where $n=1-\log_{10} f_0$, when the inspection area L is larger than or equal to 0.1 μm and is smaller than 1 μm; and
    wherein the maximum range ($\Delta y_{max}$) is approximated to $p*(1/f_0)*L^m$, when the inspection area L is larger than or equal to 1 μm.

4. A pattern inspection method comprising:
    placing a line pattern to be inspected at an inspection site;
    performing a line edge roughness measurement and calculation step;
    wherein the number of times that the line edge roughness measurement step and the calculation step are performed is determined according to formula L*M is greater than or equal to 2 μm wherein L equals the length of the line pattern inspection area, and M equals the number of line edge roughness measurements.

5. A pattern inspection method comprising:
- measuring a plurality of edge positions or line widths on a line pattern in a measurement area shorter than an inspection area using an ion beam based scanning microscope on the basis of two-dimensional distribution information about a reflected electron intensity or a secondary electron intensity obtained by observing the line pattern;
- calculating a spatial-frequency distribution about unevenness of the edge on the line pattern in the measurement area, the line width, or a variation in the line width from a measured result of a position of the edge or the line width;

obtaining an approximated curve by approximating the spatial-frequency distribution with a curve;
- estimating a spatial-frequency distribution intensity and a phase of f-components in the inspection area from the spatial-frequency distribution and the approximated curve; and
- calculating unevenness of the edge on the line pattern in the inspection area, or calculating the line width, or calculating a variation in the line width from the distribution intensity and the phase.

6. The pattern inspection method of claim 5:
- wherein the spatial frequency distribution about unevenness of the edge on the line pattern is in the range of 2 μm–200 nm for the calculation step.

7. A Scanning Electron Microscope (SEM) measurement and display method comprising:
- measuring 100 or more line-edge points on a line pattern with a Scanning Electron Microscope (SEM);
- displaying the 100 or more line-edge points on a display wherein the display shows a line pattern having a length of greater than or equal to 2 μm.

8. An improved micro electronic or micro optical product constructed by an improved process to produce fine line edge tolerances on line patterns in the micrometer range comprising:
- a substrate;
- a microelectronic line pattern formed on the substrate having line edges that vary in the line pattern dimensionally in length and width from intended manufactured error free straight line edges by the range including 0 micrometers to 1 micrometer in manufactured deviation dimensionally of length or width of the line edges of the line pattern;
- wherein said line patterns with the line edges are produced by first producing a beginning segment of the line pattern with the line edges and thereafter inspecting the line pattern by,
- setting a measurement area length (L2), when an inspection area length (L1) of a line pattern formed on a substrate measures 1 μm or more, by assuming the inspection area length (L1) multiplied by 0.5 or more to be the measurement area length (L2) and,
- also by assuming that when the inspection area length (L1) measures 0.5 μm or less, that the inspection area length (L1) is equal to the measurement area length (L2); and
- also by assuming that when the inspection area length (L1) equals greater than 0.5 μm to less than 1 μm that the measurement area length (L2) is 0.5 μm;
- measuring a plurality of line edge positions and/or line widths on the line pattern in the measurement area length (L2) using an ion beam based scanning microscope on the basis of two-dimensional distribution data information about a reflected electron intensity or a secondary electron intensity obtained by observing the line pattern; and
- calculating unevenness and deviation from the intended manufactured error free straight line edges of the line edge on the line pattern in the inspection area length (L2), or calculating the line width, or calculating a variation in the line width from a measured result of a position of the edge or from the line width measured;
- adjusting the line manufacturing process settings to produce the line edges and the line patterns so that the line pattern formed on the substrate has the line edges that vary in the line pattern dimensionally in length and width from the intended manufactured error free straight line edge by the range including 0 micrometers to 1 micrometer in manufactured deviation dimensionally of length or width of the line edges of the line pattern.

* * * * *